United States Patent
Lee et al.

(10) Patent No.: US 10,488,965 B2
(45) Date of Patent: Nov. 26, 2019

(54) TOUCH DISPLAY DEVICE, DISPLAY PANEL, TOUCH-SENSING METHOD, TOUCH-SENSING CIRCUIT, AND DRIVING CIRCUIT

(71) Applicant: LG DISPLAY CO., LTD., Seoul (KR)

(72) Inventors: YoungJoon Lee, Gyeonggi-Do (KR); HongChul Kim, Gyeonggi-Do (KR); SungYub Lee, Seoul (KR); Seongkyu Kang, Gyeonggi-Do (KR)

(73) Assignee: LG DISPLAY CO., LTD., Seoul (KR)

( * ) Notice: Subject to any disclaimer, the term of this patent is extended or adjusted under 35 U.S.C. 154(b) by 78 days.

(21) Appl. No.: 15/803,217

(22) Filed: Nov. 3, 2017

(65) Prior Publication Data
US 2018/0150163 A1    May 31, 2018

(30) Foreign Application Priority Data
Nov. 29, 2016  (KR) .......................... 10-2016-0160532

(51) Int. Cl.
*G06F 3/041*  (2006.01)
*G06F 3/044*  (2006.01)
*G06K 9/00*  (2006.01)

(52) U.S. Cl.
CPC ............ *G06F 3/0412* (2013.01); *G06F 3/044* (2013.01); *G06K 9/0002* (2013.01); *G06F 2203/04112* (2013.01); *G09G 2310/0264* (2013.01)

(58) Field of Classification Search
CPC .................. G06F 3/044; G06F 3/0412; G06F 2203/04111; G06F 3/0414
See application file for complete search history.

(56) References Cited

U.S. PATENT DOCUMENTS

| | | | | |
|---|---|---|---|---|
| 9,946,375 B2* | 4/2018 | Akhavan Fomani | ... | G06F 3/041 |
| 2002/0054394 A1* | 5/2002 | Sasaki | ................. | G06K 9/0002 |
| | | | | 358/514 |
| 2010/0110040 A1* | 5/2010 | Kim | ...................... | G06F 3/0412 |
| | | | | 345/174 |
| 2011/0193817 A1* | 8/2011 | Byun | .................... | G06F 3/0418 |
| | | | | 345/174 |
| 2013/0342478 A1* | 12/2013 | Bae | ......................... | G06F 3/041 |
| | | | | 345/173 |
| 2015/0378512 A1* | 12/2015 | Choi | ..................... | G06F 3/0418 |
| | | | | 345/174 |
| 2017/0017320 A1* | 1/2017 | Tsai | ....................... | G06F 3/044 |
| 2017/0017340 A1* | 1/2017 | Liu | ........................ | G06F 3/0416 |
| 2017/0038866 A1* | 2/2017 | Akhavan Fomani | ... | G06F 3/044 |
| 2018/0024677 A1* | 1/2018 | Kim | ...................... | G06F 3/0412 |
| | | | | 345/173 |

* cited by examiner

*Primary Examiner* — Yuzhen Shen
(74) *Attorney, Agent, or Firm* — Birch, Stewart, Kolasch & Birch, LLP

(57) ABSTRACT

A touch display device, a display panel, a touch-sensing method, a touch-sensing circuit, and a driving circuit, are discussed, which can detect a signal utilizing a pixel electrode and can remove a noise component that may be generated at the time of touch position sensing or fingerprint sensing while sensing a touch position or a fingerprint based on the detected signal, thereby improving sensing performance.

20 Claims, 26 Drawing Sheets

TOUCH DISPLAY DEVICE, DISPLAY PANEL, TOUCH-SENSING METHOD, TOUCH-SENSING CIRCUIT, AND DRIVING CIRCUIT

CROSS REFERENCE TO RELATED APPLICATION

This application claims priority from Korean Patent Application No. 10-2016-0160532, filed on Nov. 29, 2016, which is hereby incorporated by reference for all purposes as if fully set forth herein.

BACKGROUND OF THE INVENTION

1. Field of the Invention

The present invention relates to a touch display device, a display panel, a touch-sensing method, a touch-sensing circuit, and a driving circuit.

2. Description of the Related Art

With the development of the information-oriented society, demand for a display device for displaying an image in various forms has increased. Recently, various display devices such as a liquid crystal display (LCD) device, a plasma display panel (PDP), an organic light-emitting display device (OLED), etc., have been utilized.

Among such display devices, there is a touch display device capable of providing a touch-based input method that allows a user to easily input information or commands in an intuitive and convenient manner, beyond a conventional input method such as a button, a keyboard, a mouse, or the like.

In order to provide a touch-based input method, it is necessary for the touch display device to determine the presence or absence of a user's touch and accurately detect touch coordinates (touch position).

Meanwhile, recently, such a touch display device has come to utilize fingerprints, which are biometric information, as user authentication means for on-line banking, product purchase, application purchase, downloading, and the like.

Such a touch display device detects a user's fingerprint and compares the detected fingerprint with a previously stored fingerprint to perform a user authentication for the purpose of various application functions.

As described above, in order to accurately pertain the various application functions, it is important for the touch display device to accurately detect the touch position or the fingerprint.

However, the conventional touch display device still has a problem in that the performance of touch position sensing or fingerprint sensing is poor.

In addition, since the conventional touch display device detects a fingerprint in a separate area (e.g., a home button of a mobile terminal, etc.) other than an image display area, freedom of design is inhibited by the fingerprint-sensing area.

SUMMARY OF THE INVENTION

Against this background, an aspect of the present invention is to provide a touch display device, a display panel, a touch-sensing method, a touch-sensing circuit, and a driving circuit which can improve fingerprint-sensing performance.

Another aspect of the present invention is to provide a touch display device, a display panel, a touch-sensing method, a touch-sensing circuit, and a driving circuit which can improve touch-position-sensing performance.

Still another aspect of the present invention is to provide a touch display device, a display panel, a touch-sensing method, a touch-sensing circuit, and a driving circuit that can sense a fingerprint in an image display area.

Yet another aspect of the present invention is to provide a touch display device, a display panel, a touch-sensing method, a touch-sensing circuit, and a driving circuit that can remove a noise component that may be present at the time of touch position sensing or fingerprint sensing, and can detect a component that is useful for sensing, thereby improving sensing performance.

A further aspect of the present invention is to provide a touch display device, a display panel, a touch-sensing method, a touch-sensing circuit, and a driving circuit which can sense a fingerprint using a capacitive method.

A further aspect of the present invention is to provide a touch display device, a display panel, a touch-sensing method, a touch-sensing circuit, and a driving circuit that can sense a touch position or a fingerprint by an optical method.

In accordance with an aspect of the present invention, there is provided a touch display device including a display panel in which a plurality of pixels defined by a plurality of data lines and a plurality of gate lines are arranged, a pixel electrode is arranged for each pixel area, and a transistor, an ON/OFF state of which is controlled by a gate signal supplied through the gate line and which is electrically connected between the data line and the pixel electrode is arranged for each pixel area; and a touch-sensing circuit configured to acquire touch information utilizing each pixel electrode.

The touch-sensing circuit may supply a driving signal to the data line during a first section, in which the gate line is driven to be turned on, receive a first signal through the data line, receive a second signal through the data line during a second section in which the gate line is driven to be turned off, and acquire touch information based on the first signal and the second signal.

In accordance with another aspect of the present invention, there is provided a touch-sensing method of a touch display device including a display panel in which a plurality of pixels defined by a plurality of data lines and a plurality of gate lines are arranged, a pixel electrode is arranged for each pixel area, and a transistor, an ON/OFF state of which is controlled by a gate signal supplied through the gate line and which is electrically connected between the data line and the pixel electrode, is arranged for each pixel area.

The touch-sensing method may include receiving a first signal through the data line after a driving signal is supplied to the data line during a first section, in which the gate line is driven to be turned on; receiving a second signal through the data line during a second section, in which the gate line is driven to be turned off; and acquiring touch information based on the first signal and the second signal.

In accordance with still another aspect of the present invention, there is provided a touch-sensing circuit of a touch display device including a display panel in which a plurality of pixels defined by a plurality of data lines and a plurality of gate lines is arranged, a pixel electrode is arranged for each pixel area, and a transistor, an ON/OFF state of which is controlled by a gate signal supplied through the gate line and which is electrically connected between the data line and the pixel electrode, is arranged for each pixel area.

The touch-sensing circuit may include a touch-driving circuit configured to receive a first signal through the data line after a driving signal is supplied to the data line during a first section, in which the gate line is driven to be turned on, and to receive a second signal through the data line during a second section, in which the gate line is driven to be turned off; and a touch processor configured to acquire touch information based on the first signal and the second signal.

In accordance with yet another aspect of the present invention, there is provided a display panel including a plurality of data lines; a plurality of gate lines; a pixel electrode configured to be arranged for respective pixel areas of each of a plurality of pixels defined by the plurality of data lines and the plurality of gate lines; and a transistor, an ON/OFF state of which is controlled by a gate signal supplied through the gate line and which is electrically connected between the data line and the pixel electrode and is arranged for each pixel area.

In the display panel, the data line may be electrically connected to a touch-sensing circuit.

In the display panel, during a first section, the gate line may be driven to be turned on, the data line may apply a driving signal to the pixel electrode, and a first signal stored in the pixel electrode may be transmitted to the touch-sensing circuit.

During a second section after the first section, the gate line may be driven to be turned off and the data line may transmit a second signal, different from the first signal, to the touch-sensing circuit.

In accordance with a further aspect of the present invention, there is provided a touch display device including a data line; a gate line; a pixel electrode configured to be arranged for each pixel area; a transistor, an ON/OFF state of which is controlled by a gate signal supplied through the gate line and which is electrically connected between the data line and the pixel electrode; and a touch-sensing circuit, configured to be electrically connected to the data line and to detect a signal stored in the pixel electrode through the data line in order to acquire touch position information or fingerprint information.

In accordance with a further aspect of the present invention, there is provided a touch display device including a data line; a gate line; a pixel electrode configured to be arranged for each pixel area; a transistor, an ON/OFF state of which is controlled by a gate signal supplied through the gate line and which is electrically connected between the data line and the pixel electrode; a photosensor configured to be electrically connected between a source node and a drain node of the transistor; a light irradiation device configured to irradiate the photosensor with light; and a touch-sensing circuit configured to be electrically connected to the data line and to detect a leakage current through the photosensor, which reacts to light by light irradiation, through the data line to acquire touch position information or fingerprint information.

In accordance with a further aspect of the present invention, there is provided a driving circuit of a touch display device including a display panel in which a plurality of pixels defined by a plurality of data lines and a plurality of gate lines are arranged, a pixel electrode is arranged for each pixel area, and a transistor, an ON/OFF state of which is controlled by a gate signal supplied through the gate line and which is electrically connected between the data line and the pixel electrode, is arranged for each pixel area.

The driving circuit may include a data-driving circuit configured to output an image data voltage to the data line; a touch-driving circuit configured to output a driving signal for touch sensing to the data line; and a selection circuit configured to electrically connect one of the data-driving circuit and the touch-driving circuit to the data line.

When the touch-driving circuit is connected to the data line by the selection circuit, the touch-driving circuit may receive a first signal through the data line after the driving signal is supplied to the data line during a first section, in which the gate line is driven to be turned on, and may receive a second signal through the data line during a second section, in which the gate line is driven to be turned off.

As described above, according to embodiments of the present invention, it is possible to provide a touch display device, a display panel, a touch-sensing method, a touch-sensing circuit, and a driving circuit which can improve fingerprint-sensing performance.

According to embodiments of the present invention, it is possible to provide a touch display device, a display panel, a touch-sensing method, a touch-sensing circuit, and a driving circuit which can improve touch-position-sensing performance.

According to embodiments of the present invention, it is possible to provide a touch display device, a display panel, a touch-sensing method, a touch-sensing circuit, and a driving circuit which can sense a fingerprint in an image display area.

According to embodiments of the present invention, it is possible to provide a touch display device, a display panel, a touch-sensing method, a touch-sensing circuit, and a driving circuit which can remove noise components that may occur at the time of sensing a touch position or fingerprint and detect only components that are useful for sensing in order to improve sensing performance.

According to embodiments of the present invention, it is possible to provide a touch display device, a display panel, a touch-sensing method, a touch-sensing circuit, and a driving circuit which can sense a fingerprint using a capacitive method.

According to embodiments of the present invention, it is possible to provide a touch display device, a display panel, a touch-sensing method, a touch-sensing circuit, and a driving circuit which can sense a touch position or a fingerprint using an optical method.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EMBODIMENTS

Figure 1:
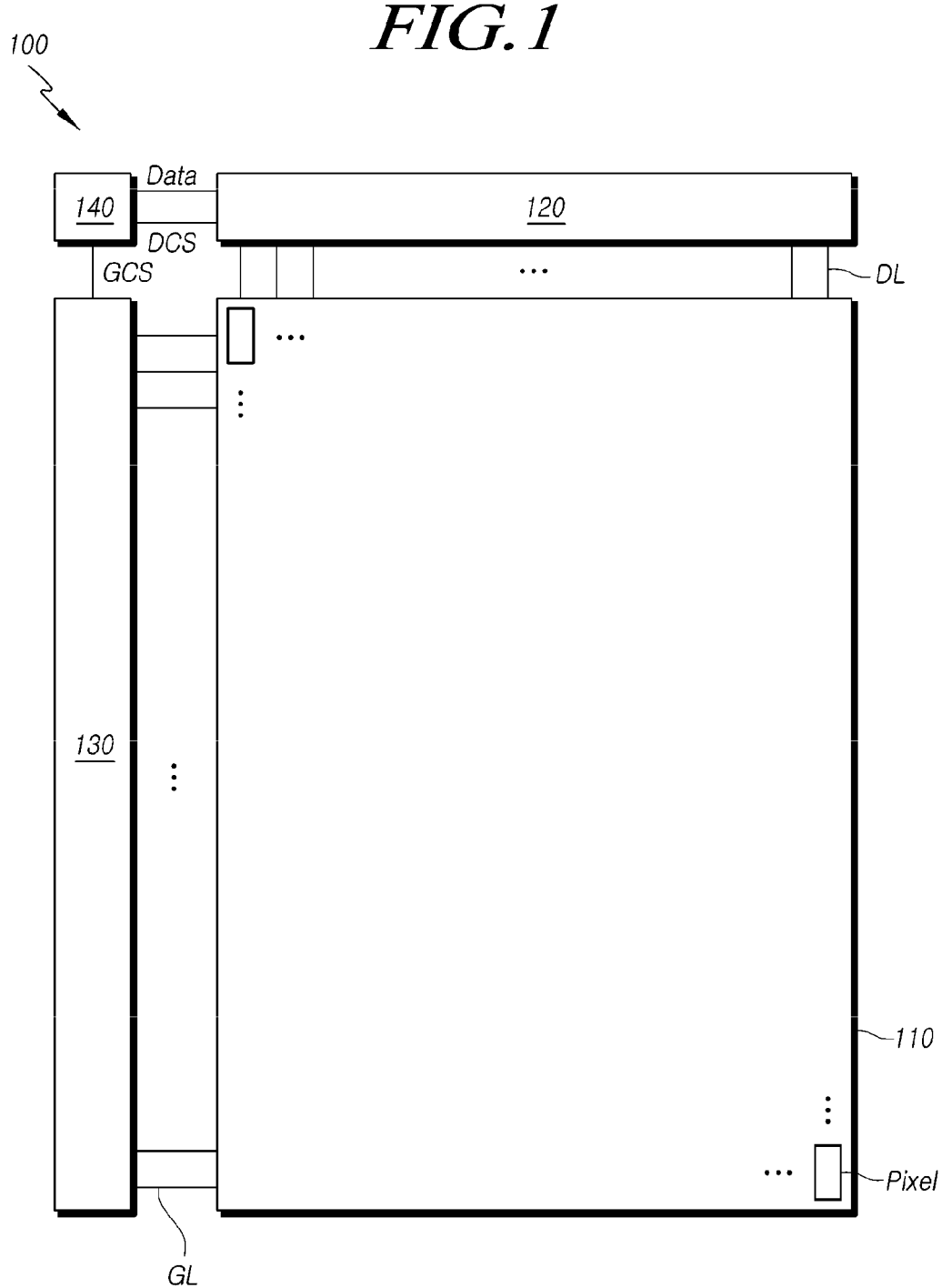
FIG. 1 is a diagram illustrating a touch display device according to embodiments of the present invention.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element. Further, the term 'may' fully encompasses all the meanings of the term 'can'.

FIG. 1 is a diagram illustrating a touch display device 100 according to embodiments of the present invention.

Referring to FIG. 1, the touch display device 100 according to the present embodiments may provide an image display function and a touch input function.

The touch display device 100 according to the present embodiments may include a display panel 110, a data-driving circuit 120, a gate-driving circuit 130, a controller 140, and the like in order to provide the image display function.

A plurality of data lines DL and a plurality of gate lines GL are arranged on the display panel 110.

In addition, a plurality of pixels defined by the data line DL and the plurality of gate lines GL are arranged in the display panel 110.

The data-driving circuit 120 is a circuit for driving the plurality of data lines DL for the purpose of image display, and can output a data voltage corresponding to an image signal to the plurality of data lines DL.

The gate-driving circuit 130 is a circuit for sequentially driving the plurality of gate lines GL for the purpose of image display, and can sequentially output gate signals (scan signals) to the plurality of gate lines GL for the purpose of image display.

The controller 140 is a component for controlling the data-driving circuit 120 and the gate-driving circuit 130, and provides various control signals (DCS, GCS, etc.) to the data-driving circuit 120 and the gate-driving circuit 130.

The controller 140 starts to perform scanning according to the timing implemented in each frame, converts input image data input from the outside according to a data signal format used in the data-driving circuit 120 and outputs the converted image data, and controls data driving at a suitable time according to the scanning.

Such a controller 140 may be a timing controller used in a conventional display technology or a controller that further performs other control functions including a timing controller.

The data-driving circuit 120 is positioned on only one side (e.g., upper side or lower side) of the display panel 110 in FIG. 1, but may be positioned on both sides (e.g., upper side and lower side) of the display panel 110 according to a driving method, a panel design method, or the like.

The data-driving circuit 120 may be implemented by including at least one source driver integrated circuit (SDIC).

Each SDIC may be connected to a bonding pad of the display panel 110 by a tape-automated-bonding (TAB) method or a chip-on-glass (COG) method, may be directly arranged on the display panel 110, or may be integrated and arranged on the display panel 110 in some cases. In addition, each SDIC may be implemented by a chip-on-film (COF) method, which is mounted on a film connected to the display panel 110.

Each SDIC may include a shift register, a latch circuit, a digital-to-analog converter (DAC), an output buffer, and the like. Each SDIC may further include an analog-to-digital converter (ADC) in some cases.

The gate-driving circuit 130 is positioned only on one side (e.g. the left side or the right side) of the display panel 110 in FIG. 1, but may be positioned on both sides (e.g. the left side and the right side) of the display panel 110 according to a driving method, a panel design method, or the like.

Such a gate-driving circuit 130 may be implemented by including at least one gate driver integrated circuit (GDIC).

Each GDIC may be connected to a bonding pad of the display panel 110 by a TAB method or a COG method, may be implemented in a gate-in-panel (GIP) type and be directly arranged on the display panel 110, or may be integrated and arranged on the display panel 110 in some cases. In addition, each GDIC may be implemented by a COF method, which is mounted on a film connected to the display panel 110.

Each GDIC may include a shift register, a level shifter, and the like.

Each of the plurality of pixels arranged in the display panel 110 may include a circuit element such as a transistor.

The types and number of the circuit elements constituting each subpixel SP may be variously determined depending on a provided function, a design method, and the like.

Figure 2:
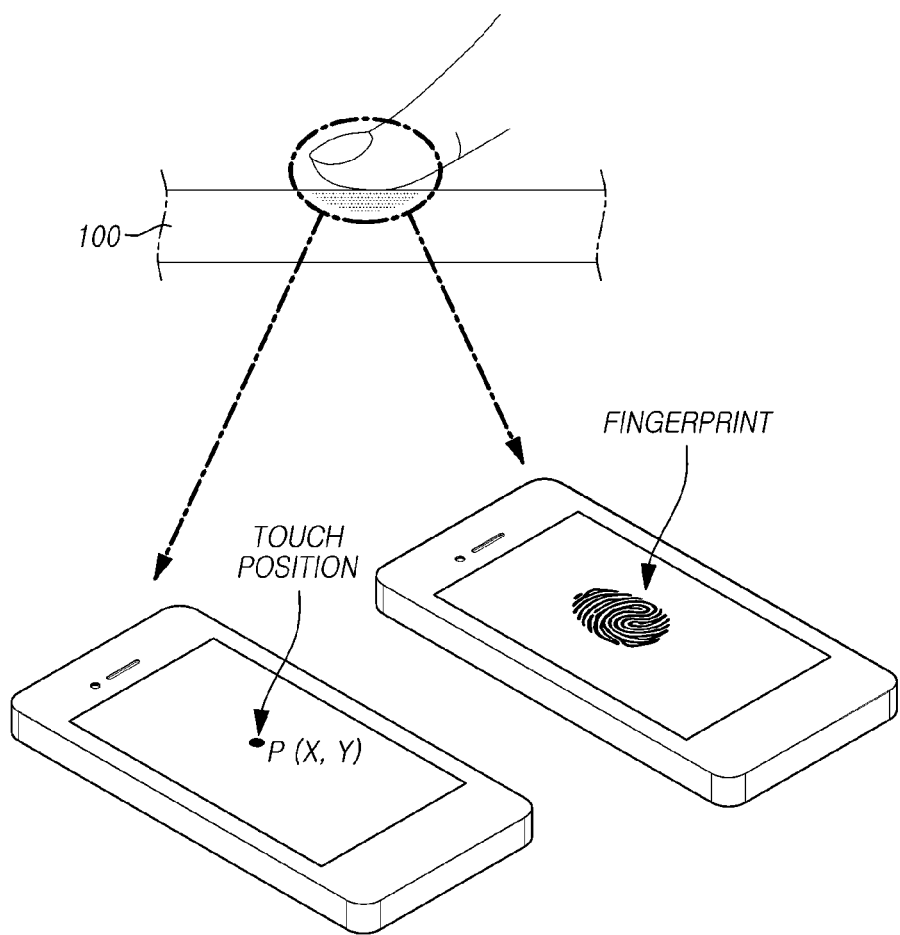
FIG. 2 is a diagram illustrating a touch state of a touch display device according to embodiments of the present invention.

FIG. 2 is a diagram illustrating a touch state of the touch display device 100 according to embodiments of the present invention.

The touch display device 100 according to the present embodiments has a function of sensing a touch of a user for the purpose of touch input.

Here, a touch object, which is a touch means of the user, may be, for example, a finger, a pen, or the like. Hereinafter, for convenience of explanation, it is assumed that the touch object is a finger.

The touch-sensing function may include a touch-position-sensing function for sensing a touch position of the user and a fingerprint-sensing function (fingerprint recognition function) for sensing a fingerprint of the user.

In the touch display device 100 according to the present embodiments, a touch position sensor for touch sensing may be embedded and arranged in the display panel 110.

For example, in the touch display device 100 according to the present embodiments, a touch screen panel may be of a type (e.g., an in-cell type, an on-cell type, or the like) that is embedded in the display panel 110.

A fingerprint sensor for fingerprint sensing may be the same as or different from the touch position sensor for touch position sensing.

In other words, the fingerprint sensor may utilize the touch position sensor for touch position sensing, or may be configured separately from the touch position sensor for touch position sensing.

The touch position sensor for touch position sensing may be arranged over the entire area of the display panel 110.

As an example, the touch position sensor for touch position sensing may be an electrode dedicated to the touch position sensor arranged on the display panel 110, or may be an electrode for displaying an image arranged on the display panel 110.

When the touch position sensor for touch position sensing is the electrode for displaying an image arranged on the display panel 110, the touch position sensor may be, for example, a common electrode (CE) that is arranged on the display panel 110 and to which a common voltage Vcom is applied for displaying an image.

Figure 3A:
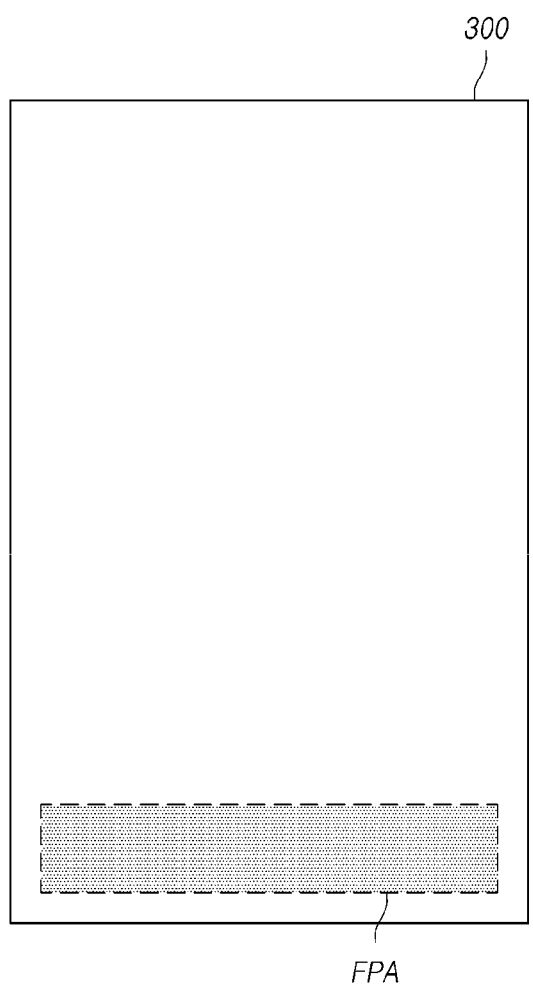
FIGS. 3A, 3B, and 3C are diagrams illustrating examples of a fingerprint-sensing area of a touch display device according to embodiments of the present invention.
Figure 3B:
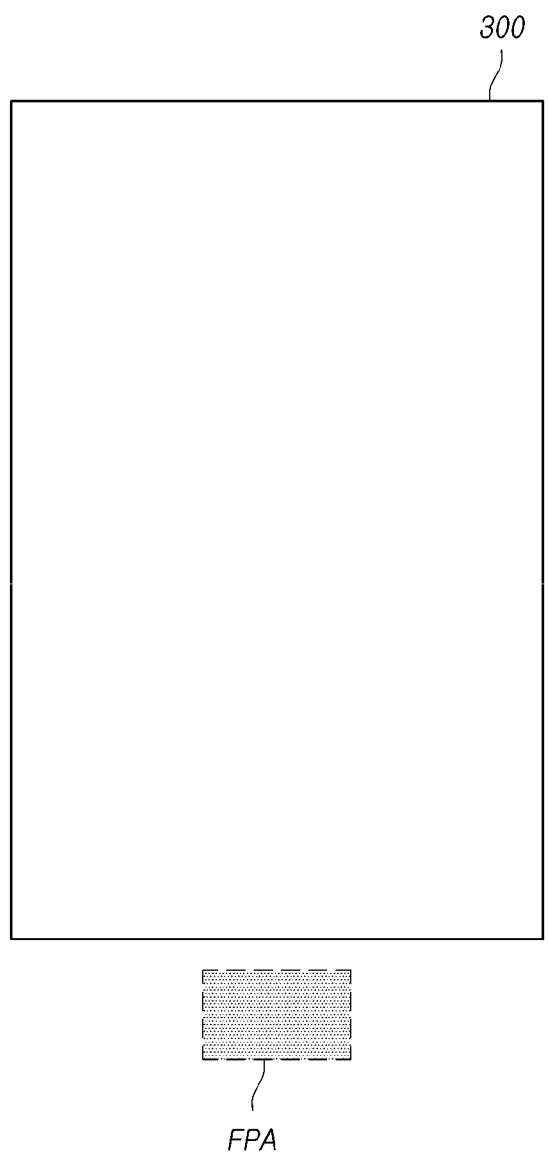
Figure 3C:
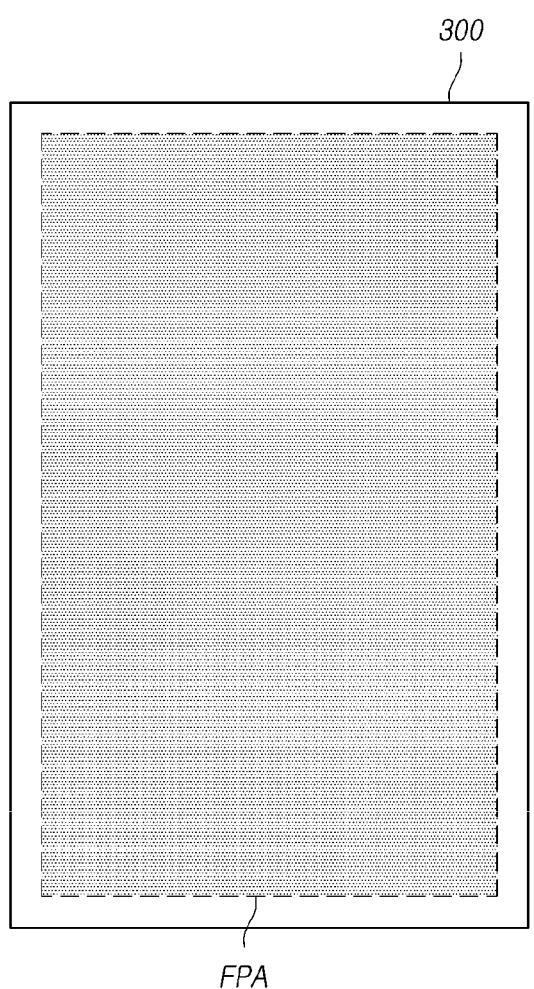

FIGS. 3A, 3B, and 3C are diagrams illustrating examples of a fingerprint-sensing area of the touch display device 100 according to embodiments of the present invention.

Referring to FIG. 3A, a fingerprint-sensing area FPA may be an area outside an image display area 300.

Referring to FIG. 3B, the fingerprint-sensing area FPA may be an area inside the image display area 300.

Referring to FIG. 3C, the fingerprint-sensing area FPA may correspond to the entire area of the image display area 300.

The fingerprint-sensing area FPA may be a front surface or a rear surface of the touch display device 100, or may be a side surface thereof in some cases.

A fingerprint sensor may be present in such a fingerprint-sensing area FPA. The fingerprint sensor may be arranged on the display panel 110, or may be arranged on a panel (sensor panel) different from the display panel 110 in some cases.

The touch display device 100 according to the present embodiments may perform touch sensing (touch position sensing or fingerprint sensing) using a pixel structure.

Here, the pixel structure may be an actual pixel structure of a pixel capable of actually displaying an image, or may be a similar pixel structure in which an image is not actually displayed, although it is similar to the actual pixel structure.

Figure 4:
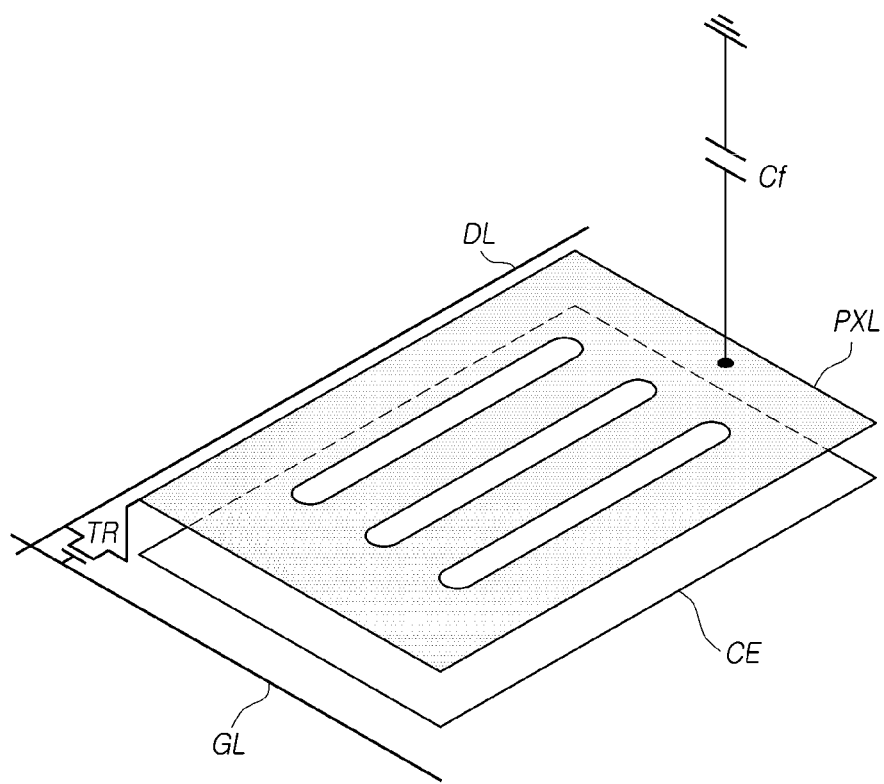
FIG. 4 is a diagram illustrating a touch-sensing structure in a touch display device according to embodiments of the present invention.

FIG. 4 is a diagram illustrating an example of a touch-sensing structure in the touch display device 100 according to embodiments of the present invention.

Referring to FIG. 4, in a pixel structure of the touch display device 100 according to the present embodiments, a pixel electrode PXL is arranged in a pixel area corresponding to one pixel defined in the data line DL and the gate line GL, and a transistor TR, an ON/OFF state of which is controlled by the gate line GL and which is electrically connected to a point between the data line DL and the pixel electrode PXL, is arranged.

In the display panel 110, there may be a common electrode CE which is arranged throughout all the pixel areas and to which a common voltage Vcom is applied. Such a common electrode CE may form each pixel electrode PXL and a corresponding capacitor Cst.

The pixel electrode PXL arranged for each pixel area functions as a fingerprint sensor. In addition, the pixel electrode PXL may or may not function as a touch position sensor.

When the pixel electrode PXL does not function as a touch position sensor, the touch position sensor may be, for example, the common electrode CE.

When the pixel electrode PXL is the touch position sensor, the touch display device 100 according to the present embodiments may detect a capacitance Cf between the pixel electrode PXL and a touch object (e.g., a finger, a pen, or the like) depending on whether or not a touch is being made through the data line DL, thereby sensing a corresponding touch position.

For example, there may be a difference between the capacitance Cf between the pixel electrode PXL which is positioned at a touch point and the touch object and the capacitance Cf between the pixel electrode PXL which is not positioned at the touch point and the touch object, and the touch display device 100 may detect such a capacitance difference to thereby sense the touch position.

The touch display device 100 according to the present embodiments may detect a capacitance Cf between the pixel electrode PXL and a fingerprint flexion depending on whether or not a touch is being made through the data line DL, thereby sensing fingerprint information.

The fingerprint has ridges, i.e., protruding portions, and valleys, i.e., depressed portions, between the ridges.

Fingerprint sensing functions to detect pattern information of the ridges and the valleys in the fingerprint as the fingerprint information.

The capacitance Cf between a ridge of the fingerprint and the pixel electrode PXL and the capacitance Cf between a valley of the fingerprint and the pixel electrode PXL may be different from each other, and the touch display device 100 may detect such a capacitance difference to thereby sense the fingerprint information.

Figure 5:
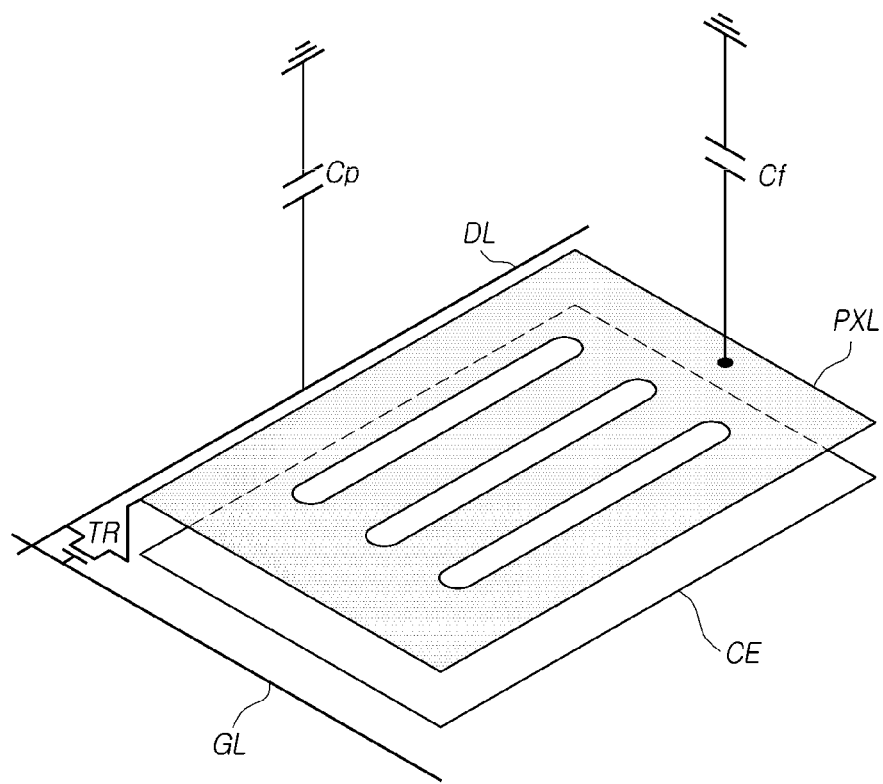
FIGS. 5 and 6 are diagrams for explaining a capacitance between a data line and a finger and deterioration of touch sensitivity due to the capacitance at the time of touch sensing of a touch display device according to embodiments of the present invention.
Figure 6:
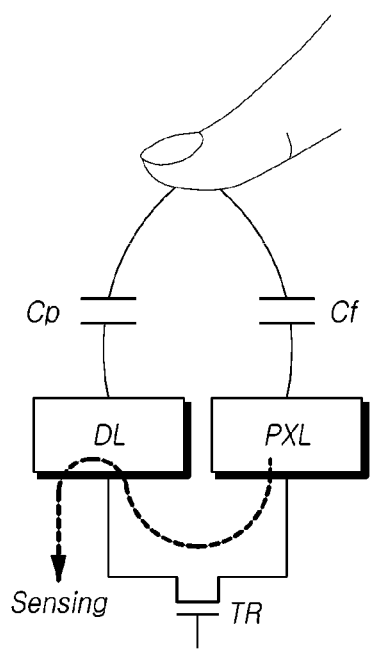

FIGS. 5 and 6 are diagrams for explaining a capacitance between the data line DL and a finger and deterioration of touch sensitivity due to the capacitance at the time of touch sensing of the touch display device 100 according to embodiments of the present invention.

A capacitance Cf is formed between a finger and the pixel electrode PXL for the purpose of touch sensing (touch position sensing or fingerprint sensing). At this time, a capacitance Cp may also be formed between the data line DL and the finger.

Hereinafter, for convenience of explanation, the capacitance Cf between the finger and the pixel electrode PXL is referred to as a finger capacitance as a capacitance required for touch sensing (touch-position sensing or fingerprint sensing).

At the time of touch sensing, a capacitance difference ΔCf formed between the pixel electrode PXL and the finger depending on whether or not a touch is being made is used, or a capacitance difference ΔCf formed between the pixel electrode PXL and the finger according to the ridges and valleys of the fingerprint is used.

However, due to the capacitance Cp formed between the data line DL and the finger, the capacitance detected for touch sensing (touch position sensing or fingerprint sensing) or a corresponding signal thereof includes not only a component of the capacitance Cf formed between the pixel electrode PXL and the finger but also a component of the capacitance Cp formed between the data line DL and the finger.

As a result, the accuracy of touch sensing may be deteriorated.

Therefore, a smaller capacitance Cp formed between the data line DL and the finger is preferable.

However, for the following reason, the capacitance Cp formed between the data line DL and the finger has a considerably large value.

The area where the data line DL and the finger overlap each other is considerably larger than the area where the pixel electrode PXL and the finger overlap each other.

As a result, there is no great difference between the capacitance Cp formed between the data line DL and the finger at a touch point and the capacitance Cp formed between the data line DL and the finger at a non-touch point.

In addition, the capacitance Cp formed between the data line DL and the finger is much larger than the capacitance Cf formed between the pixel electrode PXL and the finger.

Accordingly, the total capacitance detected for touch sensing is greatly affected by the capacitance Cp formed between the data line DL and the finger.

As a result, in the case of touch position sensing, a total capacitance detected for touch position sensing does not vary greatly based on whether or not a touch is being made, so that a corresponding touch position cannot be accurately sensed.

In addition, in the case of fingerprint sensing, a total capacitance detected for fingerprint sensing does not vary greatly regardless of the ridge and valley of the fingerprint, so that the fingerprint information cannot be accurately sensed.

In other words, due to the capacitance Cp formed between the data line DL and the finger, the performance of touch position sensing or fingerprint sensing may significantly deteriorate.

Hereinafter, a method of reducing or eliminating the influence of the capacitance Cp formed between the data line DL and the finger at the time of touch sensing will be described. However, the capacitance Cp formed between the data line DL and the finger is also referred to as a parasitic capacitance.

Figure 7:
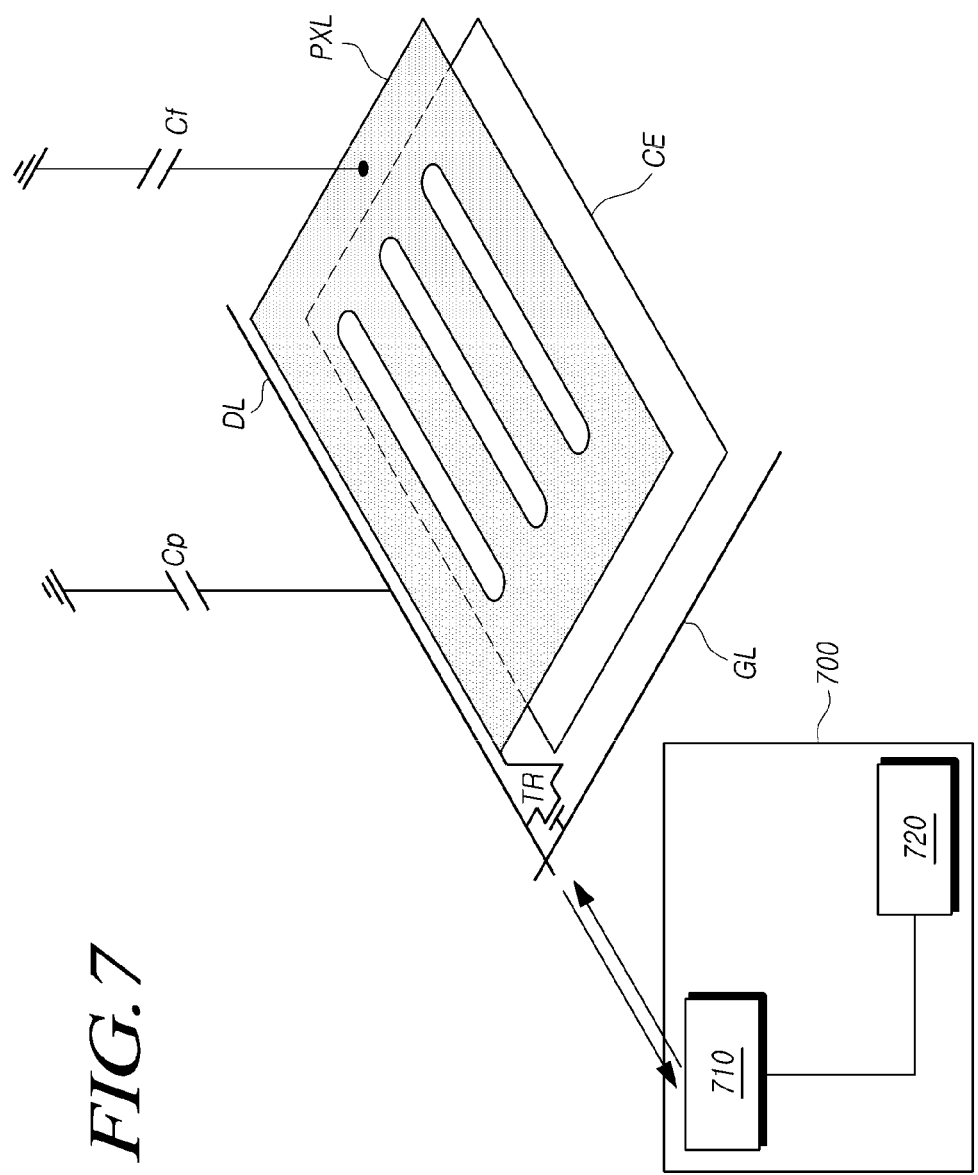
FIGS. 7 and 8 are diagrams illustrating a touch-sensing circuit according to embodiments of the present invention.
Figure 8:
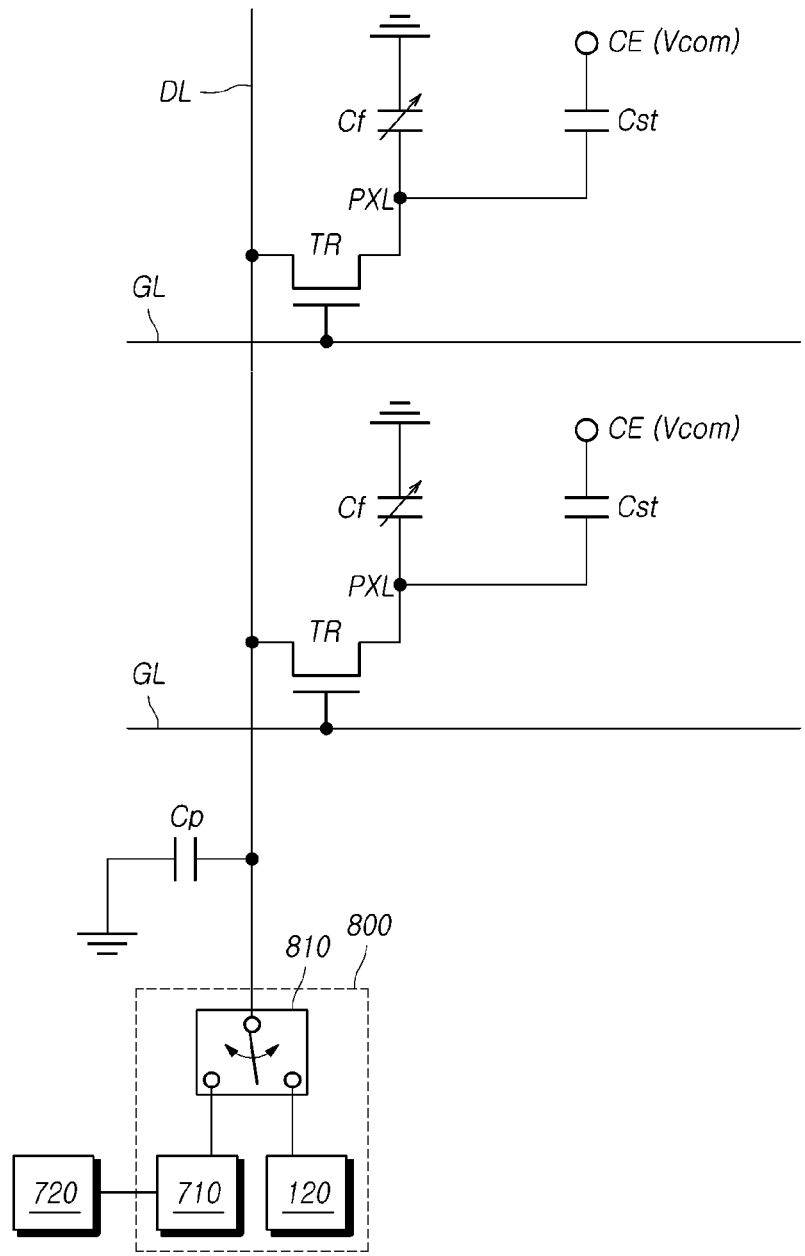
Figure 9:
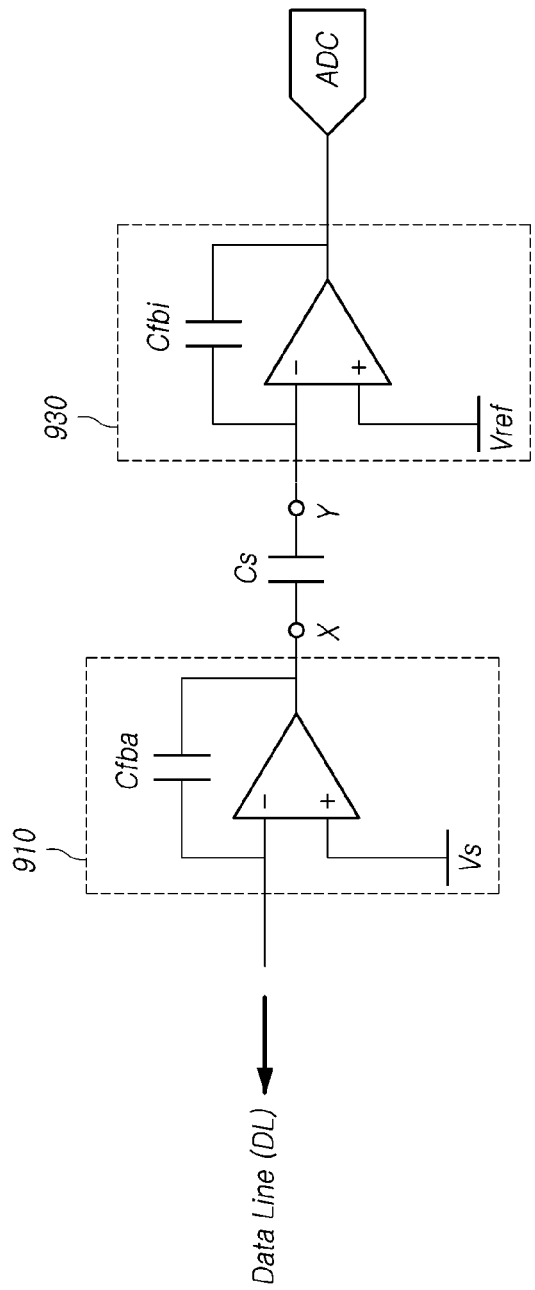
FIG. 9 is a diagram illustrating a touch-driving circuit according to embodiments of the present invention.
Figure 10A:
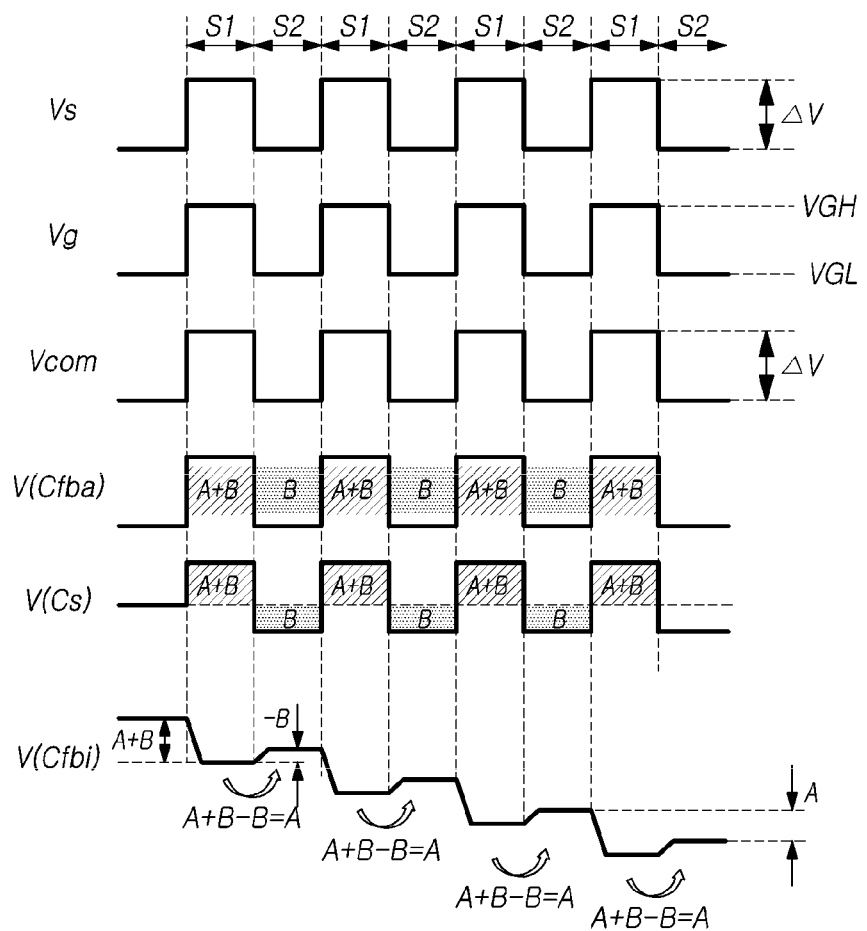
FIGS. 10A and 10B are touch-sensing timing diagrams according to embodiments of the present invention.
Figure 10B:
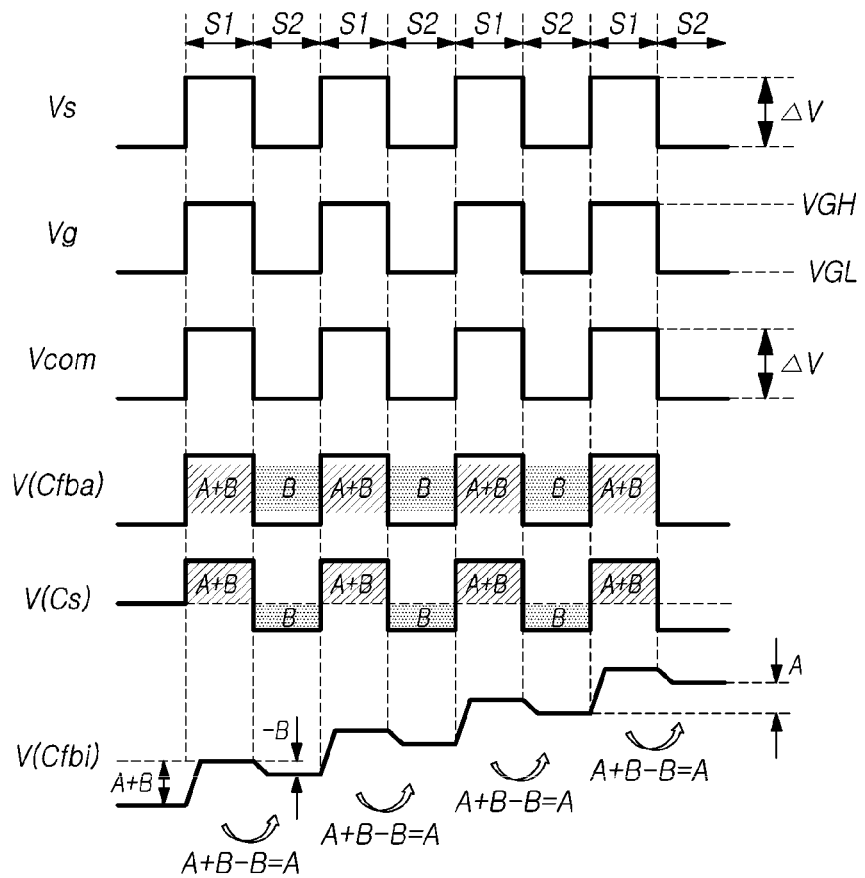
Figure 11:
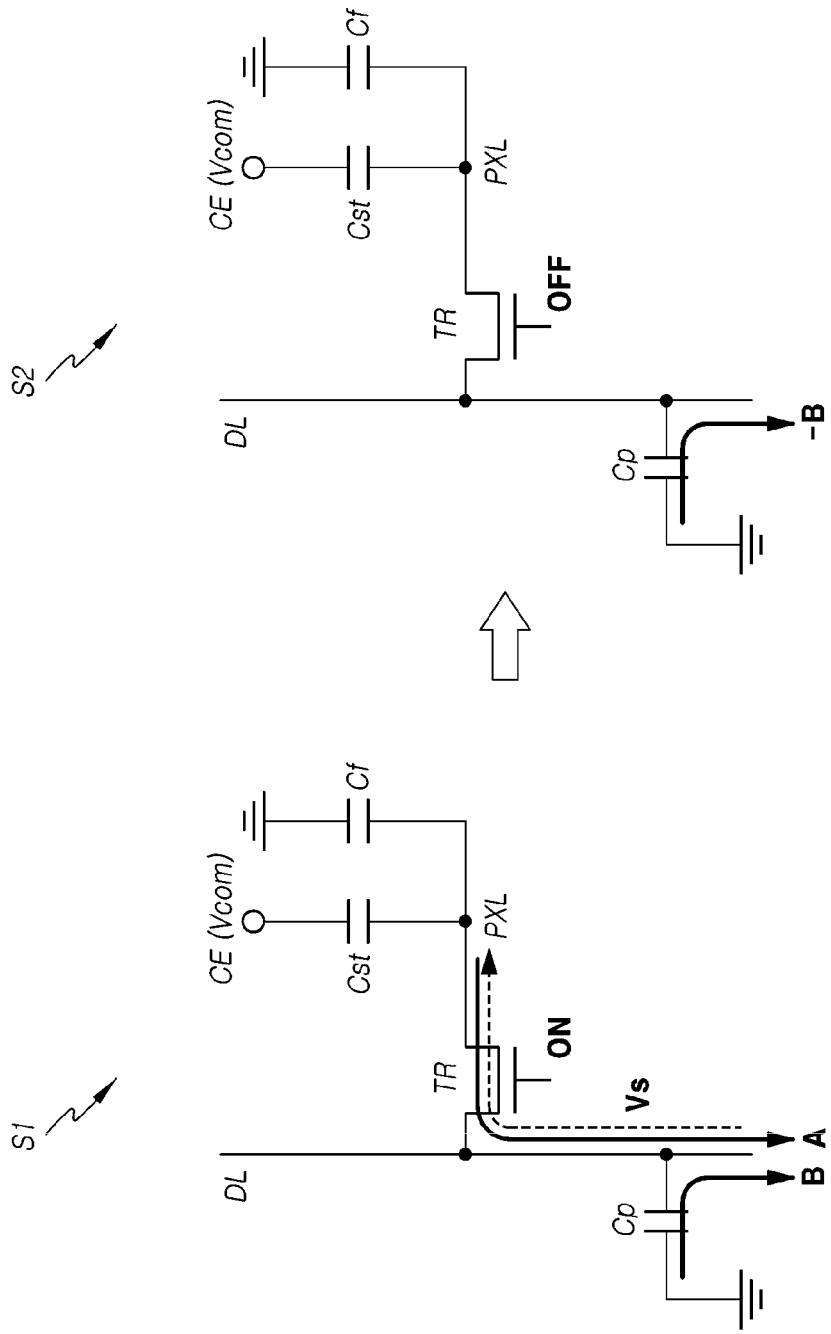
FIG. 11 is a diagram illustrating a driving state in a first section and a second section at the time of touch driving according to embodiments of the present invention.

FIGS. 7 and 8 are diagrams illustrating a touch-sensing circuit 700 according to embodiments of the present invention, FIG. 9 is a diagram illustrating a touch-driving circuit 710 according to embodiments of the present invention, FIGS. 10A and 10B are touch-sensing timing diagrams according to embodiments of the present invention, and FIG. 11 is a diagram illustrating a driving state in a first section S1 and a second section S2 at the time of touch driving according to embodiments of the present invention.

Referring to FIG. 7, the touch display device 100 according to the present embodiments may include: the display panel 110, in which a plurality of pixels defined by a plurality of data lines DL and a plurality of gate lines GL are arranged, a pixel electrode PXL is arranged for each pixel area, and a transistor TR, an ON/OFF state of which is controlled by a gate signal Vg supplied through the gate line GL and which is electrically connected to a point between the data line DL and the pixel electrode PXL, is arranged for each pixel area; and the touch-sensing circuit 700, which drives a touch position sensor or a fingerprint sensor (pixel electrode PXL) to sense a touch position or fingerprint information.

The touch-sensing circuit 700 may be electrically connected to the data line DL, and may be electrically connected to the pixel electrode PXL, which may be the touch position sensor or the fingerprint sensor, through such a data line DL.

The touch-sensing circuit 700 may supply a driving signal Vs to the data line DL during the first section S1, in which the gate line GL is driven to be turned on, and receive a first signal A+B through the data line DL, and may receive a second signal B through the data line DL during the second section S2, in which the gate line GL is driven to be turned off and acquire touch information based on the first signal A+B and the second signal B.

For example, the touch-sensing circuit 700 supplies the driving signal to the data line DL during the first section S1, in which the gate line GL is driven to be turned on, and receives the first signal A+B through the data line DL.

Next, the touch-sensing circuit 700 receives the second signal B through the data line DL during the second section S2, in which the gate line GL is driven to be turned off.

The above-described touch-sensing circuit 700 may include a touch-driving circuit 710, which is electrically connected to a touch position sensor or a fingerprint sensor (pixel electrode PXL) to drive the touch position sensor or the fingerprint sensor (pixel electrode PXL) and which detects a signal required for touch sensing through the touch position sensor or the fingerprint sensor (pixel electrode PXL), and a touch processor 720, which senses a corresponding touch position or fingerprint information based on the signal detected by the touch-driving circuit 710.

After the driving signal Vs is supplied to the data line DL during the first section S1, in which the gate line GL is driven to be turned on, the touch-driving circuit 710 may receive the first signal A+B through the data line DL, and may receive the second signal B through the data line DL during the second section S2, in which the gate line GL is driven to be turned off.

Here, the first signal A+B includes both a component of a capacitance Cf formed between the pixel electrode PXL and a finger and a component of a capacitance Cp formed between the data line DL and the finger.

The first signal A+B is a signal made not only by an electric charge stored in the capacitance Cf formed between the pixel electrode PXL and the finger but also by an electric charge stored in the capacitance Cp formed between the data line DL and the finger.

The second signal B does not include the component of the capacitance Cf formed between the pixel electrode PXL and the finger, but includes only the component of the capacitance Cp formed between the data line DL and the finger.

For example, the second signal B is a signal made by the electric charge stored in the capacitance Cp formed between the data line DL and the finger, excluding the electric charge stored in the capacitance Cf formed between the pixel electrode PXL and the finger.

The touch processor 720 may acquire the touch information based on the first signal A+B and the second signal B.

For example, the touch processor 720 may remove the component of the parasitic capacitance Cp formed between the data line DL and the finger by combining and using the first signal A+B and the second signal B, by which the touch information, which is touch position information or fingerprint information, can be accurately acquired.

As described above, by controlling the signal detection through the control of the gate line, it is possible to remove a noise component due to the parasitic capacitance Cp associated with the unnecessary data line DL at the time of touch position sensing or fingerprint sensing, and thus the touch position or the fingerprint can be accurately sensed using effective information required for touch position sensing or fingerprint sensing.

As described above, the touch-sensing circuit 700 may acquire touch presence/absence information or the touch position information as the touch information.

In this case, the touch-position-sensing performance can be improved by removing the parasitic capacitance Cp while utilizing the existing pixel electrode PXL without change as the touch position sensor for touch position sensing.

As described above, the touch-sensing circuit 700 may acquire the fingerprint information as the touch information.

In this case, the fingerprint-sensing performance can be improved by removing the parasitic capacitance Cp while utilizing the existing pixel electrode PXL without change as the fingerprint sensor for fingerprint sensing.

Meanwhile, as described above, the fingerprint-sensing area FPA may be a part of the image display area 300, may be an area outside the image display area 300, or may correspond to the entire area of the image display area 300.

When the fingerprint-sensing area FPA corresponds to the entire area of the image display area 300, the touch-sensing circuit 700 may acquire the fingerprint information as the touch information over the entire area of the display panel 110.

In this case, it is not necessary to separately include the fingerprint-sensing area FPA in addition to the image display area 300, and the fingerprint can be sensed over the entire area of the image display area 300, so that the area in which an image is not displayed in the touch display device 100 may be reduced, thereby improving a user's convenience for fingerprint sensing.

Meanwhile, referring to FIG. 8, at least one touch-driving circuit 710 and at least one data-driving circuit 120 may be integrated into one driving circuit 800 and implemented.

Referring to FIG. 8, the driving circuit 800 may include a data-driving circuit 120 for outputting an image data voltage to the data line DL, a touch-driving circuit 170 for outputting a driving signal Vs for touch sensing to the data line DL, a selection circuit 810 for electrically connecting one of the data-driving circuit 120 and the touch-driving circuit 710 to the data line DL, and the like.

When the touch-driving circuit 710 is connected to the data line DL by the selection circuit 810, the touch-driving circuit 710 may receive the first signal A+B through the data line DL after the driving signal Vs is supplied to the data line DL during the first section S1, in which the gate line GL is driven to be turned on, and may receive the second signal B through the data line DL during the second section S2, in which the gate line GL is driven to be turned off.

Using such a driving circuit 800, data driving for image display and touch driving (touch driving for touch position sensing and touch driving for fingerprint sensing) for touch sensing may be simultaneously performed, and signal detection may be controlled by controlling the gate line GL at the time of touch driving, whereby it is possible to remove the noise component due to the parasitic capacitance Cp associated with the unnecessary data line DL at the time of touch position sensing or fingerprint sensing. As a result, it is possible to improve the touch-position-sensing perforance or the fingerprint-sensing performance.

The first signal A+B may correspond to a sum of the capacitances Cf and Cst associated with the pixel electrode PXL and the capacitance Cp associated with the data line DL.

The second signal B may correspond to the parasitic capacitance Cp associated with the data line DL.

The capacities Cf and Cst associated with the pixel electrode PXL may include at least one of the capacitance Cf between the pixel electrode PXL and the touch object and the capacitance Cst between the pixel electrode PXL and the common electrode CE.

Accordingly, a component A of the first signal A+B may be a component corresponding to the capacitances Cf and Cst associated with the pixel electrode PXL, and may be a component (e.g., electric charge or voltage) corresponding to the at least one of the capacitance Cf between the pixel electrode PXL and the touch object and the capacitance Cst between the pixel electrode PXL and the common electrode CE.

A component B of the first signal A+B and the second signal B may be a component (e.g., electric charge or voltage) corresponding to the parasitic capacitance Cp associated with the data line DL.

Here, the touch object may be a finger, a pen, or the like in the case of touch position sensing, and may be a ridge or a valley of a fingerprint in the case of fingerprint sensing.

Here, a value of the capacitance Cf between the pixel electrode PXL and the touch object may vary depending on whether or not a touch is being made and may vary for ridges and valleys of fingerprints, and the touch position can be sensed or the fingerprint information can be sensed from variation in these values.

The parasitic capacitance Cp associated with the data line DL may be the capacitance Cp between the data line DL and the touch object.

By controlling the driving so that the first signal A+B and the second signal B having the above-described characteristics are detected, the component of the parasitic capacitance Cp that degrades sensing performance can be removed.

Referring to FIG. 9, the touch-driving circuit 710 according to the present embodiments includes an amplifier 910 for supplying the driving signal Vs to the data line DL, a sensing capacitor Cs for storing the first signal A+B or the second signal B, an integrator 930 for integrating the first signal A+B or the second signal B stored in the sensing capacitor Cs to output an integral value, and an ADC for converting the integral value into a digital value.

The amplifier 910 may include a first terminal (+), to which the driving signal Vs is input, a second terminal (−), in which the driving signal Vs is output to the data line DL, an amplifier feedback capacitance Cfba for storing an electric charge corresponding to the first signal A+B or the second signal B sensed through the data line DL, and an output terminal in which the first signal A+B or the second signal B corresponding to the electric charge stored in the amplifier feedback capacitance Cfba is output.

The sensing capacitor Cs electrically connects the output terminal X of the amplifier 910 and a first input terminal Y of the integrator 930 to store the first signal A+B or the second signal B.

The integrator 930 integrates the first signal A+B and the second signal B, input to the first input terminal Y, and outputs an integral value. In the integrator 930, a reference voltage Vref is input to the first input terminal.

The first signal A+B or the second signal B stored in the sensing capacitor Cs may vary based on the reference voltage Vref.

The touch processor 720 may acquire the touch information based on the digital value output from the ADC within the touch-driving circuit 710.

Here, the touch information may be touch presence/absence information or touch position information, and may be fingerprint information about the pattern (shape) of the ridges and valleys of the fingerprint.

Using the above-described touch-driving circuit 710, it is possible to remove the component of the parasitic capacitance Cp from information using touch sensing by accumulating (integrating) the first signal A+B including the parasitic capacitance Cp or its corresponding information (corresponding signal) and the second signal B not including the parasitic capacitance Cp or its corresponding information (corresponding signal).

Referring to FIGS. 10A and 10B, the driving signal Vs has a high-level voltage in the first section S1 and a low-level voltage in the second section S2.

The driving signal Vs has a predetermined amplitude ΔV. For example, the driving signal Vs applied to the pixel electrode PXL may be regarded as a pulse signal which swings with a predetermined frequency and amplitude.

The gate signal Vg applied to a gate node of the transistor TR has a turn-on-level voltage VGH in the first section S1 and a turn-off-level voltage VGL in the second section S2.

The common voltage Vcom applied to the common electrode CE during the first section S1 and the second section S2 may swing (fluctuate) in correspondence with the fluctuation of the driving signal Vs, which may be a pulse signal. At least one of the frequency, the amplitude, the phase, and the like may be the same between the common voltage Vcom and the driving signal Vs.

In FIGS. 10A and 10B, the common voltage Vcom and the driving signal Vs have the same frequency, amplitude, and phase.

As described above, when the pixel electrode PXL is utilized as the touch position sensor or the fingerprint sensor through corresponding pulsing of the driving signal Vs and the common voltage Vcom, it is possible to prevent deterioration of the sensing performance due to the common voltage Vcom applied to the common electrode CE.

As described above, by the gate signal Vg, the pixel electrode PXL may be electrically connected to or disconnected from the data line DL.

Accordingly, a signal V(Cfba) stored in the amplifier feedback capacitor Cfba through the data line DL may be the first signal A+B in the first section S1, and may be the second signal B in the second section S2.

Therefore, a signal V(Cs) stored in the sensing capacitor Cs may be the first signal A+B in the first section S1, and may be the second signal B in the second section S2.

However, when the driving signal Vs is a pulse signal, the signal V(Cs) stored in the sensing capacitor Cs is the first signal A+B at the time when the driving signal Vs rises from a low-level voltage to a high-level voltage, and the signal V(Cs) stored in the sensing capacitor Cs is the second signal B, the polarity of which is opposite that of the first signal A+B at the time when the driving signal Vs falls from the high-level voltage to the low-level voltage.

For example, the second signal B has a signal polarity opposite that of the first signal A+B. In other words, the value of the first signal A+B is A+B, and the value of the second signal B is −B.

Referring to FIGS. 10A and 10B, the first signal A+B stored in the sensing capacitor Cs in the first section S1 has a voltage value higher by A+B than the reference voltage Vref, and the second signal B stored in the sensing capacitor Cs in the second section S2 has a voltage value lower by B than the reference voltage Vref.

Accordingly, as illustrated in FIGS. 10A and 10B, when accumulation is performed using the integrator 930, A+B, −B, A+B, and −B are accumulated, so that the components −B corresponding to the parasitic capacitance Cp associated with the data line DL are all removed and only the component A, which is effective information stored in the pixel electrode PXL, remains.

By repeatedly performing this process for the number of integration operations, the component A, which is effective information stored in the pixel electrode PXL, may be accumulated so as to increase the size of the component A.

Accordingly, the value of the component A, increased by the integrator 930, is converted into a digital code by the ADC, and the touch processor 720 may acquire the touch information corresponding to the touch position information or the fingerprint information using the digital code.

As described above, the second signal B has a signal polarity opposite that of the first signal A+B, so that the effective component A, required for sensing, may be accumulated in isolation by removing the component B associated with the parasitic capacitance Cp formed in the data line DL, thereby improving the sensing performance.

As described above, the touch-sensing circuit 700 may use the first section S1 and the second section S2 as one set section, accumulate the first signal A+B and the second signal B, obtained by repeatedly performing the set section two or more times, remove the component B associated with the parasitic capacitance Cp formed in the data line DL, and increase only the effective component A, required for sensing, to acquire the touch information, thereby improving the sensing performance.

Figure 12:
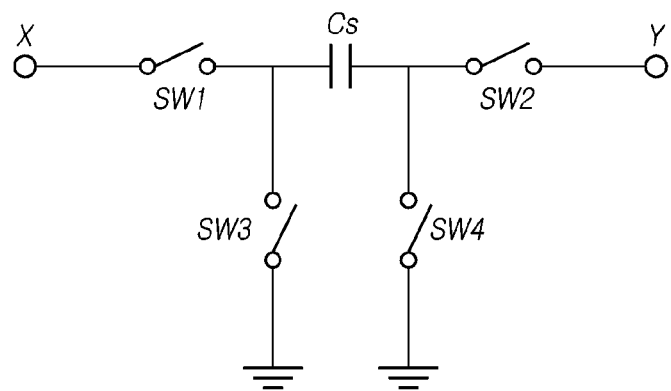
FIGS. 12 and 13 are diagrams illustrating examples of a sensing capacitor circuit and an operation timing diagram in a touch-driving circuit according to embodiments of the present invention.
Figure 14:
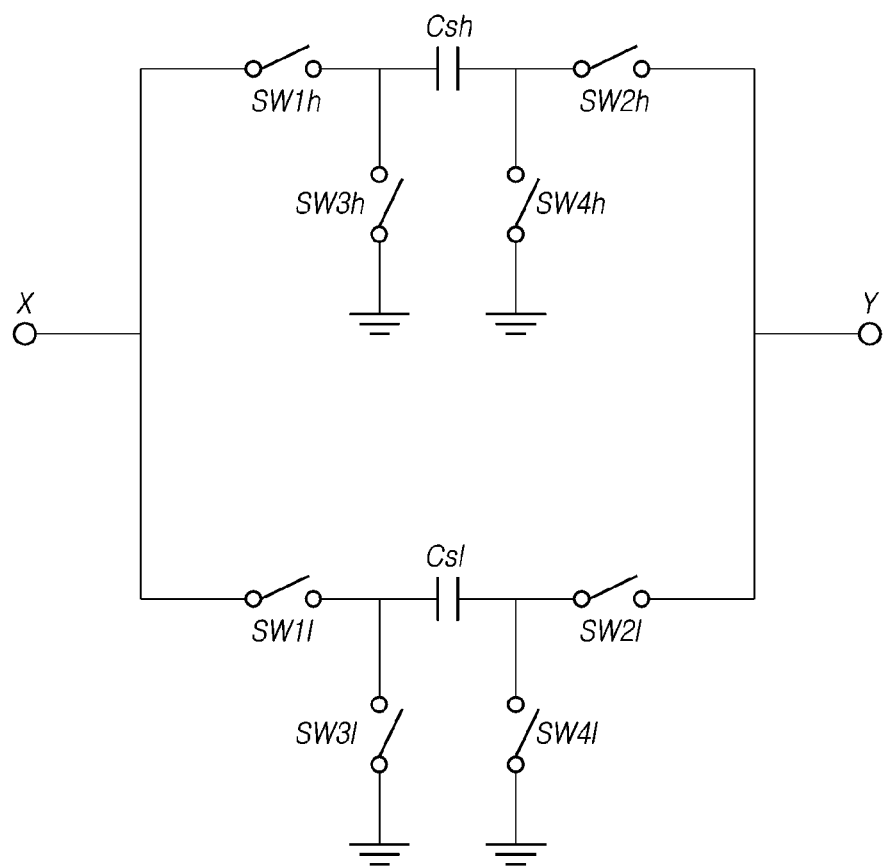
FIGS. 14 and 15 are diagrams illustrating another example of a sensing capacitor circuit and an operation timing diagram in a touch-driving circuit according to embodiments of the present invention.

Meanwhile, the sensing capacitor Cs configured between the terminal X and the terminal Y in the touch-driving circuit 710 of FIG. 9 may be implemented in the form of a sensing capacitor circuit illustrated in FIG. 12 or 14 in order to output the first signal A+B and the second signal B input to the terminal X to the terminal Y so that the integration operation of the integrator 930 may be accurately performed.

Figure 13:
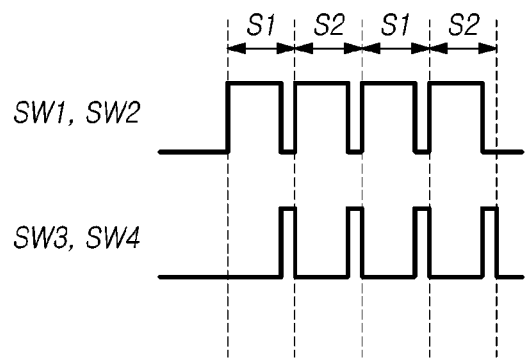

FIGS. 12 and 13 are diagrams illustrating examples of a sensing capacitor circuit and an operation timing diagram in the touch-driving circuit 710 according to embodiments of the present invention. However, these correspond to a voltage conversion diagram of FIG. 10A.

Referring to FIG. 12, the sensing capacitor circuit may include a sensing capacitor Cs, in which the first signal A+B or the second signal B is stored, a first switch SW1, connecting the terminal X and the sensing capacitor Cs, a second switch SW2, connecting the terminal Y and the sensing capacitor Cs, a third switch SW3, connecting a point between the first switch SW1 and the sensing capacitor Cs with a ground point, a fourth switch SW4, connecting a point between the second switch SW2 and the sensing capacitor Cs with the ground point, and the like.

Referring to FIG. 13, the first switch SW1 and the second switch SW2 are turned on and off in the same manner, and the third switch SW3 and the fourth switch SW4 are turned on and off in the same manner.

The third switch SW3 and the fourth switch SW4 operate inversely to the on/off operation of the first switch SW1 and the second switch SW2.

Referring to FIG. 13, the first switch SW1 and the second switch SW2 are turned on in the first section S1 and the second section S2 so that the signal (the first signal or the second signal) input to the terminal X is stored in the sensing capacitor Cs and is transmitted to the integrator 930, and is then turned off.

The third switch SW3 and the fourth switch SW4 are turned on in a section in which the first switch SW1 and the second switch SW2 are turned off, so that the signal (electric charge) stored in the sensing capacitor Cs is discharged to reset the sensing capacitor Cs.

Figure 15:
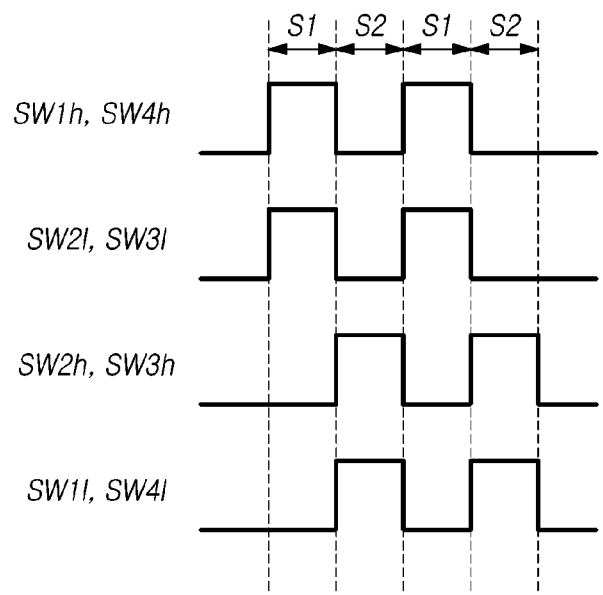

FIGS. 14 and 15 are diagrams illustrating another example of a sensing capacitor Cs circuit and an operation timing diagram in the touch-driving circuit 710 according to the embodiments of the present invention. However, these correspond to a voltage conversion diagram of FIG. 10B.

Referring to FIG. 14, the sensing capacitor circuit may include a first circuit portion and a second circuit portion.

The first circuit portion may include a first sensing capacitor Csh in which the first signal A+B is stored, a 1-1 switch SW1h connecting the terminal X and the first sensing capacitor Csh, a 1-2 switch SW2h connecting the terminal Y and the first sensing capacitor Csh, a 1-3 switch SW3h connecting a point between the 1-1 switch SW1h and the first sensing capacitor Csh with a ground point, a 1-4 switch SW4h connecting a point between the first sensing capacitor Csh and the 1-2 switch SW2h with the ground point, and the like.

The second circuit portion may include a second sensing capacitor Csl in which the second signal B is stored, a 2-1 switch SW1l connecting the terminal X and the second sensing capacitor Csl, a 2-2 switch SW2l connecting the terminal Y and the second sensing capacitor Csl, a 2-3 switch SW3l connecting a point between the 2-1 switch SW1l and the second sensing capacitor Csl with a ground point, a 2-4 switch SW4l connecting a point between the second sensing capacitor Csl and the 2-2 switch SW2l with the ground point, and the like.

Referring to FIG. 15, the 1-1 switch SW1h and the 1-4 switch SW4h are turned on and off in the same manner, and the 1-2 switch SW2h and the 1-3 switch SW3h are turned on and off in the same manner. In addition, the 2-1 switch SW1l and the 2-4 switch SW4l are turned on and off in the same manner and the 2-2 switch SW2l and the 2-3 switch SW3l are turned on and off in the same manner.

In addition, the 1-1 switch SW1h, the 1-4 switch SW4h, the 2-2 switch SW2l, and the 2-3 switch SW3l are turned on and off in the same manner.

The 1-2 switch SW2h, the 1-3 switch SW3h, the 2-1 switch SW1l, and the 2-4 switch SW4l are turned on and off in the same manner.

The 1-2 switch SW2h, the 1-3 switch SW3h, the 2-1 switch SW1l, and the 2-4 switch SW4l operate inversely to the on/off operation of the 1-1 switch SW1h, the 1-4 switch SW4h, the 2-2 switch SW2l, and the 2-3 switch SW3l.

In the first section S1, the 1-1 switch SW1h and the 1-4 switch SW4h are turned on, so that the first signal A+B is stored in the first sensing capacitor Csh. At this time, the 1-2 switch SW2h and the 1-3 switch SW3h are turned off. In the second section S2, the 1-1 switch SW1h and the 1-4 switch SW4h are turned off and the 1-2 switch SW2h and the 1-3 switch SW3h are turned on, so that the first signal A+B stored in the first sensing capacitor Csh is transmitted to the integrator 930.

In the second section S2, the 2-1 switch SW1l and the 2-4 switch SW4l are turned on so that the second signal B is stored in the second sensing capacitor Csl. At this time, the 2-2 switch SW2l and the 2-3 switch SW3l are turned off.

In the next first section S1, the 2-1 switch SW1l and the 2-4 switch SW4l are turned off and the 2-2 switch SW2l and the 2-3 switch SW3l are turned on, so that the second signal B stored in the second sensing capacitor Csl is transmitted to the integrator 930.

The touch display device 100 according to the above-described embodiments may provide a capacitance-type sensing function for sensing the touch position and the fingerprint based on the capacitance Cf formed between the pixel electrode PXL and the finger according to the presence or absence of touch or the ridge or valley of the fingerprint while utilizing the pixel electrode PXL as a sensor (touch position sensor or fingerprint sensor).

Meanwhile, the touch display device 100 according to the present embodiments may provide an optical-type sensing function in which the electric charge stored in the capacitance Cf formed between the pixel electrode PXL and the finger is leaked through a photosensor that reacts to light and the touch position or the fingerprint is sensed based on a leakage current that varies depending on whether or not a touch is being made and that is different for ridges and valleys of the fingerprint.

The touch display device 100 according to the present embodiments may provide only the capacitance-type sensing function, may provide only the optical-type sensing function, or may provide a sensing function realized as a combination of the capacitance type and the optical type.

Figure 16:
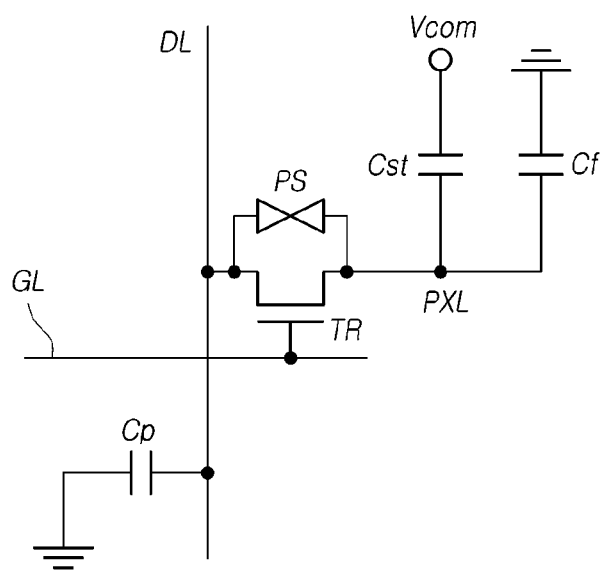
FIG. 16 is a diagram illustrating an example of a touch-sensing structure further including a photosensor in a touch display device according to embodiments of the present invention.

FIG. 16 is a diagram illustrating an example of a touch-sensing structure further including a photosensor PS in the touch display device 100 according to embodiments of the present invention.

Referring to FIG. 16, the touch display device 100 according to the present embodiments may further include a photosensor PS that is electrically connected to a point between a source node and a drain node of the transistor TR and reacts to irradiated light to conduct a leakage current for each pixel area.

The photosensor PS is a sensor for sensing the touch position or the fingerprint. The photosensor PS may be, for example, a separate transistor or an electrode layer that connects the source node and the drain node of the transistor TR.

The photosensor PS may react to light of a predetermined wavelength to cause a leakage current to flow between the source node and the drain node of the transistor TR.

For example, the photosensor PS reacts to the irradiated light to be electrically connected to a point between the source node and the drain node of the transistor TR.

The degree to which the photosensor PS reacts to the irradiated light may vary depending on whether there is a finger on the photosensor PS and may also vary depending on whether a finger portion on the photosensor PS is the ridge or the valley of the fingerprint.

For example, the magnitude (amount of current) of the leakage current through the photosensor PS may vary depending on whether there is a finger on the photosensor PS and whether the finger portion on the photosensor PS is the ridge or the valley of the fingerprint.

The touch display device 100 according to the present embodiments may sense the touch position or the fingerprint information by detecting variation in the magnitude of the leakage current through the photosensor PS.

As described above, the touch display device 100 according to the present embodiments may provide only the optical-type sensing function, or may provide a sensing function realized as a combination of the capacitance type and the optical type.

Figure 17:
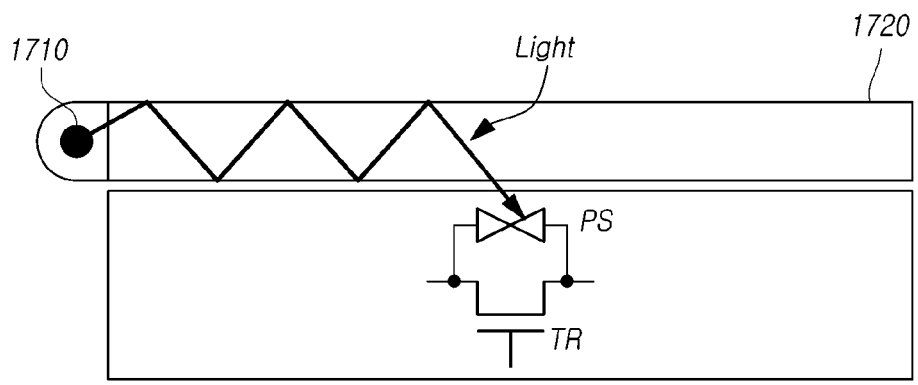
FIG. 17 is a diagram illustrating components for irradiating a photosensor with light in a touch display device according to embodiments of the present invention.
Figure 18:
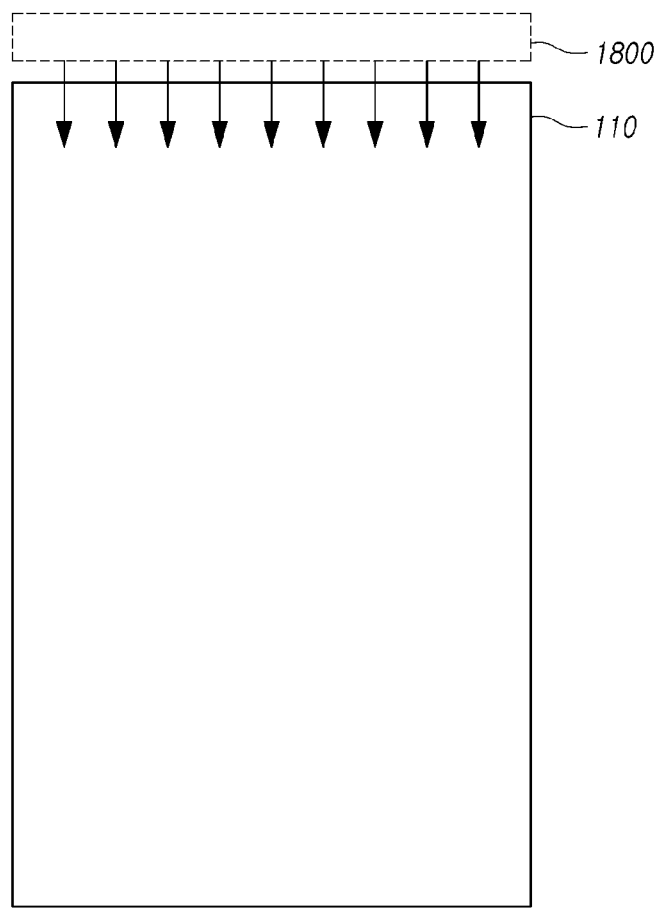
FIG. 18 is a diagram illustrating, by way of example, a position of a light output device in a touch display device according to embodiments of the present invention.

FIG. 17 is a diagram illustrating components for irradiating the photosensor PS with light in the touch display device 100 according to embodiments of the present invention, and FIG. 18 is a diagram illustrating, by way of example, the position of a light output device in the touch display device 100 according to embodiments of the present invention.

Referring to 17, the touch display device 100 according to the present embodiments is a light irradiation device for irradiating the photosensor PS with light, and may further include a light output device 1710 for outputting light and a light guide member 1720 for guiding light emitted from the light output device 1710 to be radiated on the photosensor PS.

The light output timing of the above-described light output device 1710 may be controlled by the touch processor 720, the touch-driving circuit 710, or the controller 140.

As described above, the light output device 1710 may control radiation of light to the photosensor PS, and thus the optical-type sensing function can be achieved and can be accurately and efficiently provided.

The light output from the light output device 1710 may be transmitted to the photosensor PS arranged in the pixel area while being totally reflected through the light guide member 1720.

Referring to FIG. 17, the light guide member 1720 may be located in a different layer (e.g., upper layer) from the transistor TR.

In addition, the light guide member 1720 may be located in a different layer from the photosensor PS.

The light output device 1710 may be located around the fingerprint-sensing area FPA. For example, as illustrated in FIG. 18, the light output device 1710 may be located in the outer area 1800 of the touch display device 100.

The light guide member 1720 may be arranged over the entire area or a part of the display panel 110.

As described above, touch position sensing and fingerprint sensing may be performed throughout the entire area of the image display area 300 of the display panel 110.

Figure 19:
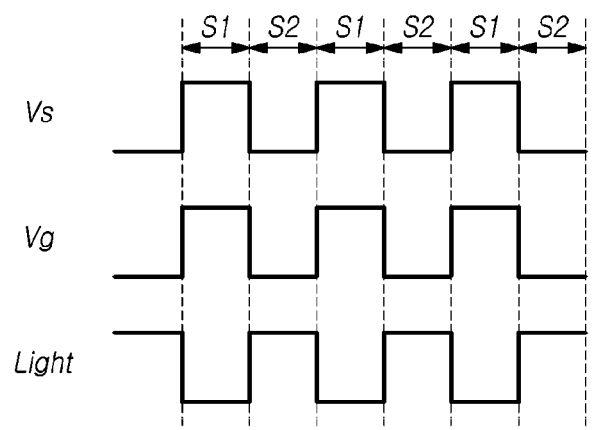
FIG. 19 is a diagram illustrating light irradiation timing in a touch display device according to embodiments of the present invention.

FIG. 19 is a diagram illustrating light irradiation timing in the touch display device 100 according to embodiments of the present invention.

Referring to FIG. 19, in regard to the light irradiation timing (light output timing), the photosensor PS may be turned on in a section in which the transistor TR is turned off by the gate signal Vg.

The light irradiation timing may be variously changed according to a driving method of removing the parasitic capacitance Cp associated with the data line DL as well as the light irradiation timing illustrated in FIG. 19.

For example, during a section in which the driving signal Vs is a high-level voltage, the transistor TR is turned on and then turned off. When the transistor TR is turned on, light may be controlled not to be radiated on the photosensor PS, and when the transistor TR is turned off, light may be controlled to be radiated on the photosensor PS. At this time, a signal A+B obtained by combining the component A attributable to the leakage current and the component B attributable to the parasitic capacitance Cp associated with the data line DL is detected.

Next, during a section in which the driving signal Vs is a low-level voltage, light is not radiated on the photosensor PS. At this time, a signal B corresponding to the component B of the parasitic capacitance Cp associated with the data line DL is detected without the component A due to the leakage current.

As described above, even when the transistor TR is turned off, the leakage current may be generated depending on whether or not a touch is being made and on whether a ridge or valley of the fingerprint is performing the touch, so that touch sensing utilizing the optical type may be performed, and using this characteristic, the sensing performance may be improved by removing the parasitic capacitance Cp associated with the data line DL.

Figure 20:
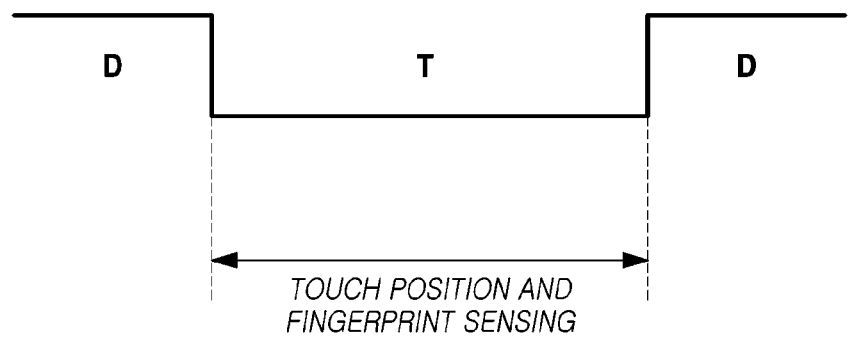
FIGS. 20 to 22 are diagrams illustrating examples of fingerprint sensing timing of a touch display device according to embodiments of the present invention.
Figure 21:
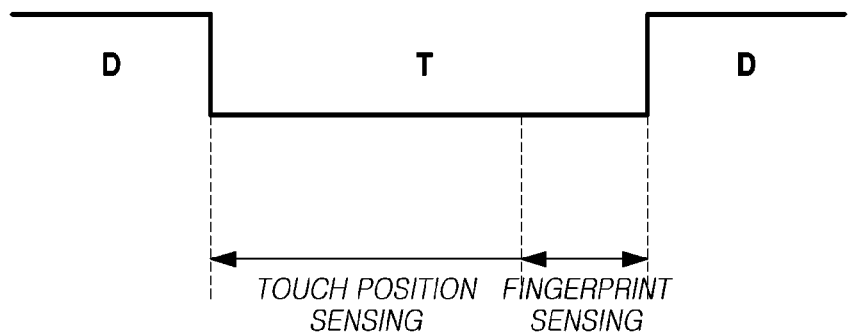
Figure 22:

FIGS. 20 to 22 are diagrams illustrating examples of fingerprint sensing timing of the touch display device 100 according to embodiments of the present invention.

Referring to FIGS. 20 to 22, the touch display device 100 according to the present embodiments may perform time-division on a display section D for displaying an image and a touch-sensing section T for touch sensing.

Referring to FIG. 20, the touch display device 100 according to the present embodiments may simultaneously perform touch position sensing and fingerprint sensing during all or part of the touch-sensing section T.

Referring to FIG. 21, the touch display device 100 according to the present embodiments may perform touch position sensing and fingerprint sensing by dividing all or a part of the touch-sensing section T into a touch-position-sensing section and a fingerprint sensing section.

Referring to FIG. 22, the touch display device 100 according to the present embodiments may perform fingerprint sensing in accordance with an event triggered by a specific function (application).

Hereinafter, a touch-sensing method of the above-described touch display device 100 will be briefly described.

Figure 23:
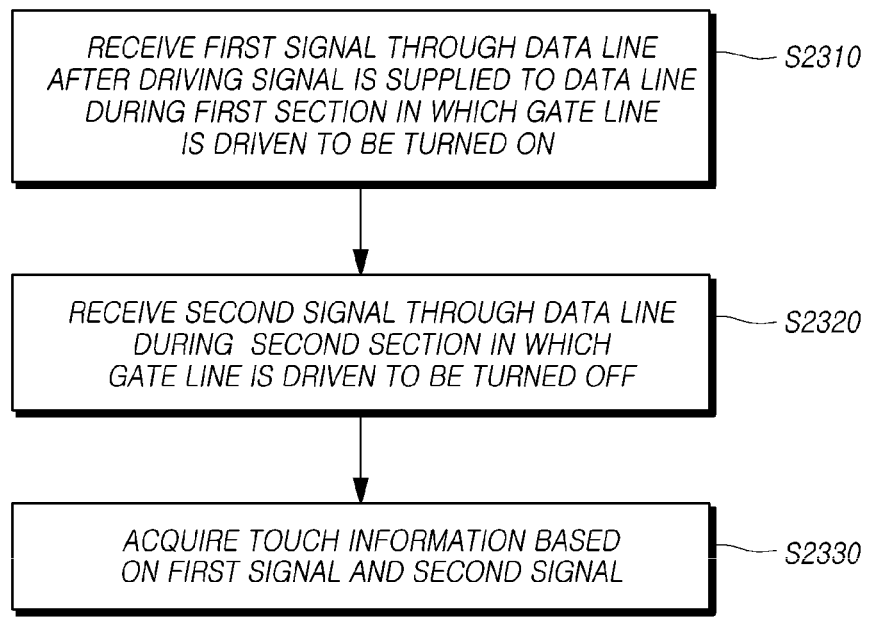
FIG. 23 is a flowchart illustrating a touch-sensing method of a touch display device according to embodiments of the present invention.

FIG. 23 is a flowchart illustrating a touch-sensing method of the touch display device 100 according to embodiments of the present invention.

Referring to FIG. 23, there may be provided the touch-sensing method of the touch display device 100 according to the present embodiments including the display panel 110, in which a plurality of pixels defined by a plurality of data lines DL and a plurality of gate lines GL is arranged, a pixel electrode PXL is arranged for each pixel area, and a transistor TR, an ON/OFF state of which is controlled by a gate signal Vg supplied through the gate line GL and which is electrically connected to a point between the data line DL and the pixel electrode PXL, is arranged for each pixel area.

The touch-sensing method may include operation S2310 of receiving a first signal A+B through the data line DL after a driving signal Vs is supplied to the data line DL during a first section S1, in which the gate line GL is turned on, operation S2320 of receiving a second signal B through the data line DL during a second section S2 in which the gate line GL is turned off, operation S2330 of acquiring touch information based on the first signal A+B and the second signal B, and the like.

Operations S2310 and S2320 described above may be repeatedly performed.

Using the above-described touch-sensing method, a noise component due to the parasitic capacitance Cp associated with the unnecessary data line DL at the time of touch position sensing or fingerprint sensing may be removed, and thus the touch position or the fingerprint can be accurately sensed using effective information needed for touch position sensing or fingerprint sensing.

According to the above-described embodiments, it is possible to provide the touch display device 100, the display panel 110, the touch-sensing method, the touch-sensing circuit 700, and the driving circuit 800 which can improve fingerprint-sensing performance.

According to the present embodiments, it is possible to provide the touch display device 100, the display panel 110, the touch-sensing method, the touch-sensing circuit 700, and the driving circuit 800 which can improve touch-position-sensing performance.

According to the present embodiments, it is possible to provide the touch display device 100, the display panel 110, the touch-sensing method, the touch-sensing circuit 700, and the driving circuit 800 which can sense a fingerprint in an image display area.

According to the present embodiments, it is possible to provide the touch display device 100, the display panel 110, the touch-sensing method, the touch-sensing circuit 700, and the driving circuit 800 which can remove a noise component (e.g., the parasitic capacitance Cp associated with the data line DL) that may occur at the time of touch position sensing or fingerprint sensing, and can detect a component that is useful for sensing, thereby improving sensing performance.

According to the present embodiments, it is possible to provide the touch display device 100, the display panel 110, the touch-sensing method, the touch-sensing circuit 700, and the driving circuit 800 which can perform touch sensing in a capacitive method by utilizing the pixel electrode PXL as a sensor.

According to the present embodiments, it is possible to provide the touch display device 100, the display panel 110, the touch-sensing method, the touch-sensing circuit 700, and the driving circuit 800 which can sense the touch position or the fingerprint by an optical method.

All the components of the touch display device, the display panel, the touch-sensing circuit, and the driving circuit according to all embodiments of the present invention are operatively coupled and configured.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention.

Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A touch display device comprising:
    a display panel in which a plurality of pixels defined by a plurality of data lines and a plurality of gate lines are arranged, a pixel electrode is arranged for each pixel area, and a transistor, an ON/OFF state of which is controlled by a gate signal supplied through a gate line and which is electrically connected between a data line and the pixel electrode, is arranged for each pixel area; and
    a touch-sensing circuit configured to supply a driving signal to the data line during a first section, in which the gate line is driven to be turned on, to receive a first signal through the data line, to receive a second signal through the data line during a second section, in which the gate line is driven to be turned off, and to acquire touch information based on the first signal and the second signal,
    wherein the first section and the second section are included in a time of touch driving, and
    wherein the first signal corresponds to a sum of a capacitance associated with the pixel electrode and a parasitic capacitance associated with the data line, and the second signal corresponds to the parasitic capacitance associated with the data line.

2. The touch display device of claim 1, wherein:
    the capacitance associated with the pixel electrode includes at least one of a capacitance between the pixel electrode and a touch object and a capacitance between the pixel electrode and a common electrode, and
    the parasitic capacitance associated with the data line is a capacitance between the data line and the touch object.

3. The touch display device of claim 1, wherein the touch-sensing circuit includes:
    a touch-driving circuit including an amplifier for supplying the driving signal to the data line, a sensing capacitor for storing the first signal or the second signal, an integrator for integrating the first signal or the second signal stored in the sensing capacitor to output an integral value, and an analog-to-digital converter (ADC) for converting the integral value into a digital value, and
    a touch processor configured to acquire the touch information based on the digital value.

4. The touch display device of claim 1, wherein the second signal has a signal polarity opposite that of the first signal.

5. The touch display device of claim 1, wherein the touch-sensing circuit uses the first section and the second section as one set section to perform the set section two or more times, and accumulates the first signal and the second signal to acquire the touch information.

6. The touch display device of claim 1, wherein the driving signal applied to the pixel electrode is a pulse signal, and a common voltage applied to a common electrode varies in correspondence with the driving signal.

7. The touch display device of claim 1, further comprising:

a photosensor electrically connected between a source node and a drain node of the transistor and configured to conduct a leakage current in response to radiation of light thereon.

8. The touch display device of claim 7, further comprising:
a light source configured to output the light; and
a light guide member configured to guide the light source from the light source to be radiated on the photosensor.

9. The touch display device of claim 8, wherein:
the light guide member is located in a different layer from the transistor and is arranged over an entire area or a part of the display panel, and
the light source is located in an outer area of the touch display device.

10. The touch display device of claim 7, wherein the photosensor is turned on in a section in which the transistor is turned off.

11. The touch display device of claim 1, wherein the touch-sensing circuit acquires touch presence/absence information or touch position information corresponding to the touch information.

12. The touch display device of claim 1, wherein the touch-sensing circuit acquires fingerprint information corresponding to the touch information.

13. The touch display device of claim 12, wherein the touch-sensing circuit acquires the fingerprint information from the entire area of the display panel when acquiring the fingerprint information corresponding to the touch information.

14. A touch-sensing method of a touch display device including a display panel in which a plurality of pixels defined by a plurality of data lines and a plurality of gate lines is arranged, a pixel electrode is arranged for each pixel area, and a transistor, an ON/OFF state of which is controlled by a gate signal supplied through a gate line and which is electrically connected between a data line and the pixel electrode, is arranged for each pixel area, the touch-sensing method comprising:
receiving a first signal through the data line after a driving signal is supplied to the data line during a first section, in which the gate line is driven to be turned off;
receiving a second signal through the data line during a second section, in which the gate line is driven to be turned on; and
acquiring touch information based on the first signal and the second signal,
wherein the first section and the second section are included in a time of touch driving, and
wherein the first signal corresponds to a sum of a capacitance associated with the pixel electrode and a parasitic capacitance associated with the data line, and the second signal corresponds to the parasitic capacitance associated with the data line.

15. A touch-sensing circuit of a touch display device including a display panel in which a plurality of pixels, defined by a plurality of data lines and a plurality of gate lines, is arranged, a pixel electrode is arranged for each pixel area, and a transistor, an ON/OFF state of which is controlled by a gate signal supplied through a gate line and which is electrically connected between a data line and the pixel electrode, is arranged for each pixel area, the touch-sensing circuit comprising:
a touch-driving circuit configured to receive a first signal through the data line after a driving signal is supplied to the data line during a first section, in which the gate line is driven to be turned on, and to receive a second signal through the data line during a second section, in which the gate line is driven to be turned off; and
a touch processor configured to acquire touch information based on the first signal and the second signal,
wherein the first section and the second section are included in a time of touch driving, and
wherein the first signal corresponds to a sum of a capacitance associated with the pixel electrode and a parasitic capacitance associated with the data line, and the second signal corresponds to the parasitic capacitance associated with the data line.

16. The touch-sensing circuit of claim 15, wherein the touch-driving circuit includes:
an amplifier for supplying the driving signal to the data line;
a sensing capacitor for storing the first signal or the second signal;
an integrator for integrating the first signal or the second signal stored in the sensing capacitor to output an integral value; and
an analog-to-digital converter (ADC) for converting the integral value into a digital value, and
wherein the touch processor acquires the touch information based on the digital value.

17. The touch-sensing circuit of claim 15, wherein the second signal has a signal polarity opposite that of the first signal.

18. A display panel comprising:
a plurality of data lines;
a plurality of gate lines;
a pixel electrode arranged for respective pixel areas of each a plurality of pixels defined by the plurality of data lines and the plurality of gate lines; and
a transistor, an ON/OFF state of which is controlled by a gate signal supplied through a gate line and which is electrically connected between the data line and the pixel electrode and is arranged for each pixel area, wherein:
a data line is electrically connected to a touch-sensing circuit,
during a first section, the gate line is driven to be turned on, the data line applies a driving signal to the pixel electrode, and a first signal stored in the pixel electrode is transmitted to the touch-sensing circuit, and
during a second section, after the first section, the gate line is driven to be turned off and the data line transmits a second signal, different from the first signal, to the touch-sensing circuit,
wherein the first section and the second section are included in a time of touch driving.

19. The display panel of claim 18, further comprising:
a photosensor electrically connected between a source node and a drain node of the transistor and configured to conduct a leakage current in response to radiation of light thereon.

20. A driving circuit of a touch display device including a display panel in which a plurality of pixels defined by a plurality of data lines and a plurality of gate lines is arranged, a pixel electrode is arranged for each pixel area, and a transistor, an ON/OFF state of which is controlled by a gate signal supplied through a gate line and which is electrically connected between a data line and the pixel electrode, is arranged for each pixel area, the driving circuit comprising:
a data-driving circuit configured to output an image data voltage to the data line;

a touch-driving circuit configured to output a driving signal for touch sensing to the data line; and a selection circuit electrically connecting one of the data-driving circuit and the touch-driving circuit to the data line, wherein:

when the touch-driving circuit is connected to the data line by the selection circuit, the touch-driving circuit receives a first signal through the data line after the driving signal is supplied to the data line during a first section, in which the gate line is driven to be turned on, and receives a second signal through the data line during a second section, in which the gate line is driven to be turned off, wherein the first section and the second section are included in a time of touch driving, and wherein the first signal corresponds to a sum of a capacitance associated with the pixel electrode and a parasitic capacitance associated with the data line, and the second signal corresponds to the parasitic capacitance associated with the data line.

* * * * *